United States Patent
Jeong et al.

(10) Patent No.: US 10,648,859 B2
(45) Date of Patent: May 12, 2020

(54) PRINTER AND PRINTER SYSTEM FOR PRINTING RE-ADHERABLE MEMO PAPER

(71) Applicant: MANGOSLAB CO., LTD., Seongnam-si (KR)

(72) Inventors: Yong Soo Jeong, Suwon-si (KR); Yong Shik Park, Yongin-si (KR); Jin Ah Kim, Seoul (KR); Sang Yeon Kim, Suwon-si (KR)

(73) Assignee: MANGOSLAB CO., LTD., Seongnam-si (KR)

( * ) Notice: Subject to any disclaimer, the term of this patent is extended or adjusted under 35 U.S.C. 154(b) by 0 days.

(21) Appl. No.: 16/312,610

(22) PCT Filed: Jul. 20, 2017

(86) PCT No.: PCT/KR2017/007836
§ 371 (c)(1),
(2) Date: Dec. 21, 2018

(87) PCT Pub. No.: WO2018/093011
PCT Pub. Date: May 24, 2018

(65) Prior Publication Data
US 2019/0257691 A1    Aug. 22, 2019

(30) Foreign Application Priority Data

Nov. 16, 2016  (KR) .................. 10-2016-0152567
Nov. 16, 2016  (KR) .................. 10-2016-0152568

(51) Int. Cl.
*G01J 1/44*    (2006.01)
*B41J 3/407*   (2006.01)
(Continued)

(52) U.S. Cl.
CPC .................. *G01J 1/44* (2013.01); *B41J 3/407* (2013.01); *B41J 3/4075* (2013.01); *B41J 3/46* (2013.01);
(Continued)

(58) Field of Classification Search
CPC .......... G01J 1/44; G01J 2003/467; G01J 3/46; B41J 3/407; B41J 11/00; B41J 3/46;
(Continued)

(56) References Cited

U.S. PATENT DOCUMENTS

2016/0246555 A1    8/2016  Tsuji

FOREIGN PATENT DOCUMENTS

EP    1838047       9/2007
JP    2001063195    3/2001
(Continued)

OTHER PUBLICATIONS

International Search Report—PCT/KR2017/007836 dated Nov. 28, 2017.
(Continued)

*Primary Examiner* — Tammy Paige Goddard
*Assistant Examiner* — Darryl V Dottin
(74) *Attorney, Agent, or Firm* — Cantor Colburn LLP

(57) ABSTRACT

Provided is a printer system for printing a repositionable note. The system includes a printer that prints a repositionable note and a cartridge that accommodates the repositionable note and is coupled to the printer. The cartridge includes an indication unit that indicates color information previously defined for the repositionable note accommodated in the cartridge, and the printer includes a sensing unit matched with the indication unit included in the cartridge to sense color information of the repositionable note indicated by the indication unit and recognizes a color of the repositionable note accommodated in the printer and changes a Bluetooth (Continued)

search name according to the color of the repositionable note. The system further includes a user client that can be linked to the printer via Bluetooth and is connected to a predetermined printer by using the Bluetooth search name.

18 Claims, 28 Drawing Sheets

(51) Int. Cl.
| | | |
|---|---|---|
| B41J 11/00 | (2006.01) | |
| G06F 3/12 | (2006.01) | |
| H04W 4/00 | (2018.01) | |
| G01J 3/46 | (2006.01) | |
| B41J 15/04 | (2006.01) | |
| B41J 3/46 | (2006.01) | |
| H04W 4/80 | (2018.01) | |

(52) U.S. Cl.
CPC ............. *B41J 11/00* (2013.01); *B41J 11/009* (2013.01); *B41J 11/0075* (2013.01); *B41J 15/044* (2013.01); *G01J 3/46* (2013.01); *G06F 3/1201* (2013.01); *G06F 3/1204* (2013.01); *G06F 3/1205* (2013.01); *G06F 3/1229* (2013.01); *G06F 3/1292* (2013.01); *H04W 4/00* (2013.01); *H04W 4/80* (2018.02); *G01J 2003/467* (2013.01)

(58) Field of Classification Search
CPC .... B41J 11/0075; B41J 15/044; B41J 11/009; B41J 3/4075; G06F 3/1201; G06F 3/1204; G06F 3/1205; G06F 3/1229; G06F 3/1292; H04W 4/00; H04W 4/80
USPC ................................................ 358/1.14, 1.15
See application file for complete search history.

(56) References Cited

FOREIGN PATENT DOCUMENTS

| | | |
|---|---|---|
| JP | 4960818 | 6/2012 |
| KR | 200124825 | 3/1999 |
| KR | 20120022727 | 3/2012 |
| KR | 20140125610 | 10/2014 |
| KR | 20160094252 | 8/2016 |

OTHER PUBLICATIONS

European Search Report—European Application No. 17871833.4, dated Nov. 29, 2019, citing US 2016/246555 and EP 1 838 047.

FIG. 15
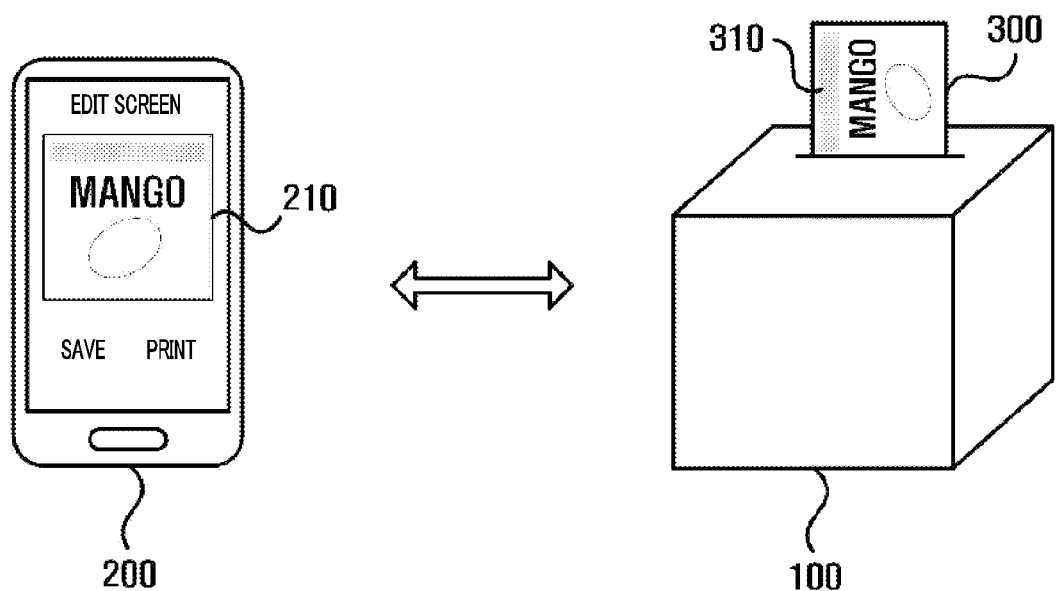
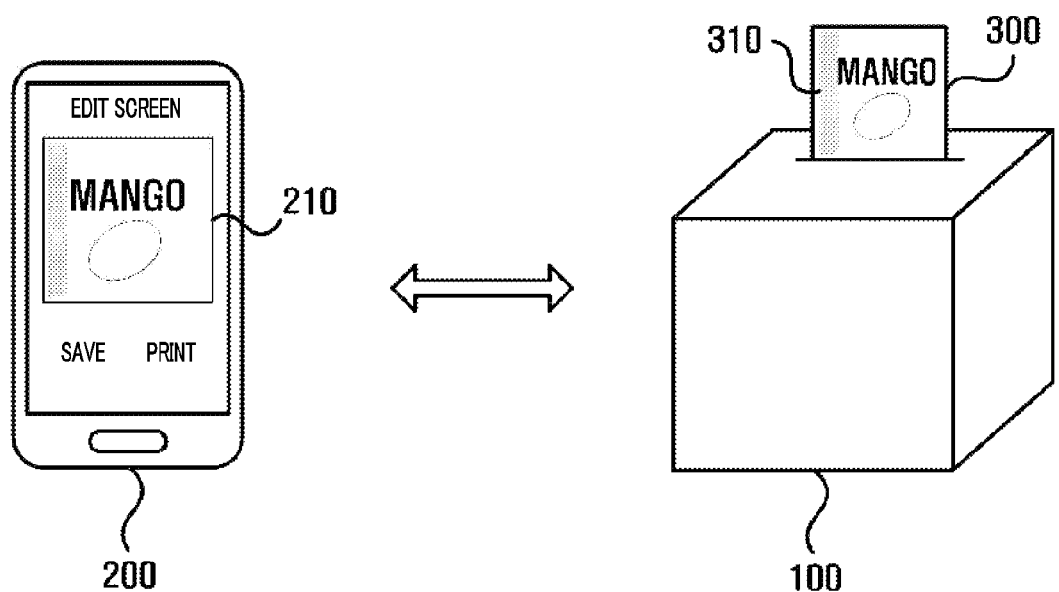

FIG. 26
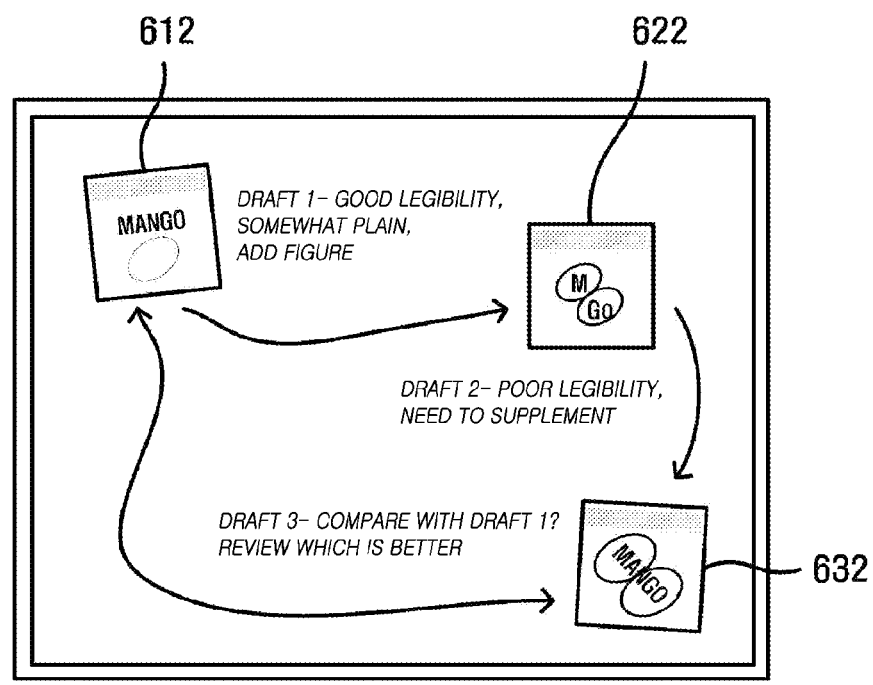
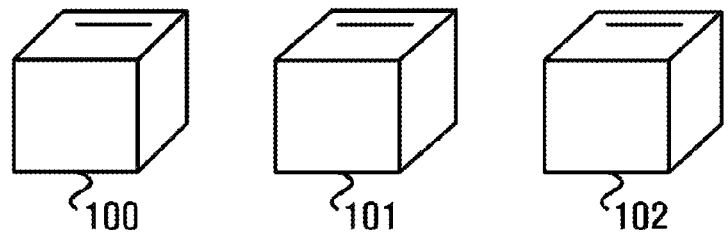

PRINTER AND PRINTER SYSTEM FOR PRINTING RE-ADHERABLE MEMO PAPER

TECHNICAL FIELD

The present disclosure relates to a printer system for printing a repositionable note.

BACKGROUND

Repositionable notes that have adhesive properties and can be repeatedly attached and detached have been used in everyday life and in study or business to note important information.

Conventionally, users have used repositionable notes to handwrite what they want thereon. In this case, it has been difficult to write contents unsuitable for handwriting such as images, tables, graphs, symbols, figures, and photos on the repositionable notes.

In the recent business environment, various means have been used such as smart devices including smart phones for taking a note or conducting a meeting through a chat room. However, doing business and conducting meetings offline is also still preferred for free exchange of opinions and diversity of expression.

Accordingly, there has been a demand for the development of a system capable of providing both the convenience of smart devices and offline autonomy by using a printer apparatus which can be linked to a smart device.

DISCLOSURE OF THE INVENTION

Problems to be Solved by the Invention

The present disclosure provides a printer system for printing a repositionable note.

However, problems to be solved by the present disclosure are not limited to the above-described problems. Although not described herein, other problems to be solved by the present disclosure can be clearly understood by those skilled in the art from the following descriptions.

Means for Solving the Problems

A printer and a printer system for printing a repositionable note includes: a printer that recognizes a color of a repositionable note accommodated in the printer with a Bluetooth search name including a color field indicating a color of the repositionable note accommodated in the printer and changes the color field of the Bluetooth search name according to the recognized color if the recognized color is different from a color indicated by the color field of the Bluetooth search name; and a user client capable of pairing with the printer via Bluetooth, and colors of repositionable notes accommodated in one or more printers are displayed when the user client obtains the colors of repositionable notes Bluetooth search names of the one or more printers capable of pairing by Bluetooth search and obtains the colors of the repositionable notes accommodated in the one or more printers by using color fields of the obtained Bluetooth search names of the one or more printers, and when an input to select one of the displayed colors is made, a Bluetooth printer with a color field of a Bluetooth search name corresponding to the selected color is paired with the user client.08

Further, the printer and printer system for printing a repositionable note includes a cartridge that accommodates the repositionable note and is coupled to the printer, and the cartridge may include an indication unit that indicates color information previously defined for the repositionable note accommodated in the cartridge.

Furthermore, the printer may include a sensing unit matched with the indication unit included in the cartridge to sense color information of the repositionable note indicated by the indication unit.

Moreover, if color information of the repositionable note sensed by the sensing unit is different from the color indicated by the color field of the Bluetooth search name, the printer may change the color field of the Bluetooth search name according to the sensed color information.

Further, the color information of the repositionable note is expressed as a previously defined value, and the indication unit includes one or more indicator channels for expressing the value, and the sensing unit includes one or more sensing channels matched with the one or more indicator channels to sense values expressed by the respective one or more indicator channels, and the printer obtains the values expressing the color information by using the one or more sensing channels and obtains color information of the repositionable note from the obtained values.

Furthermore, the color information of the repositionable note is expressed as a previously defined binary number, and each of the one or more indicator channels may indicate 0 or 1 representing each digit of the binary number.

Moreover, each of the one or more sensing channels is configured as a photointerrupter including a light emitting diode and a phototransistor, and the respective one or more indicator channels include means for blocking light receiving of the phototransistors according to the values indicated by the respective one or more indicator channels, and the respective one or more sensing channels sense the values indicated by the respective one or more indicator channels according to whether the phototransistors receive light or not.

Further, each of the one or more indicator channels includes a resistor element that has different resistances depending on the values indicated by the respective one or more indicator channels, and the respective one or more sensing channels include means for measuring resistances of the resistor elements provided in the respective indictor channels and sense the values indicated by the respective one or more indicator channels according to the values of the resistances measured from the respective indictor channels.

Furthermore, each of the one or more indicator channels includes a means for allowing different currents to pass through depending on the values indicated by the respective one or more indicator channels, and the respective one or more sensing channels include means for measuring the currents of the respective indicator channels and sense the values indicated by the respective one or more indicator channels according to the values of the currents measured from the respective indictor channels.

Moreover, each of the one or more indicator channels includes a hall sensor, and the respective one or more indicator channels include magnets according to the values indicated by the respective one or more indicator channels and the respective one or more sensing channels sense the values indicated by the respective one or more indicator channels according to sensing results of the hall sensors.

Further, the indication unit indicates a remaining amount of the repositionable note accommodated in the cartridge, and the printer uses the sensing unit to obtain information about the remaining amount of the repositionable note indicated by the sensing unit.

Furthermore, the printer includes a means for measuring a weight of the cartridge and estimates a remaining amount of the repositionable note accommodated in the cartridge by using the measured weight of the cartridge.

Moreover, the repositionable note is configured in the form of a roll including a repositionable adhesive portion, and the system may include a cartridge that accommodates the roll-shaped repositionable note and is mounted in the printer.

Further, the Bluetooth search name may include a name field indicating a name of the printer and a color field indicating a color of a repositionable note accommodated in the printer.

Furthermore, if the repositionable note accommodated in the printer is replaced with a repositionable note of another color, the printer may recognize the color of the replaced repositionable note and change the color field of the Bluetooth search name according to the color of the replaced repositionable note.

Moreover, if the repositionable note accommodated in the printer is replaced with a repositionable note of another color, the printer may disconnect itself from the user client, and the user client performs Bluetooth search by using the name field of the printer to connect itself again to the printer.

Further, if the repositionable note accommodated in the printer is replaced with a repositionable note of another color, the user client obtains a changed Bluetooth search name of the printer according to the color of the replaced repositionable note and changes the Bluetooth search name of the printer stored in the user client with the obtained Bluetooth search name.

Furthermore, the printer further includes: a display unit that displays the recognized color of the repositionable note on the outside of the printer; and a lighting apparatus that displays the recognized color of the repositionable note on the inside of the printer, and a housing of the printer may be formed of a material that transmits light of the lighting apparatus and a color of the printer may be changed depending on the recognized color of the repositionable note.

A printer for printing a repositionable note according to another aspect of the present disclosure includes a cartridge that accommodates the repositionable note and is coupled to the printer and includes an indication unit that indicates color information previously defined for the accommodated repositionable note and a sensing unit matched with the indication unit included in the cartridge to sense color information of the repositionable note indicated by the indication unit. The printer is linked to a user client via Bluetooth, recognizes a color of the repositionable note accommodated therein, and changes a Bluetooth search name according to the recognized color of the repositionable note.

A printer system for printing a repositionable note according to another aspect of the present disclosure includes a printer that prints a repositionable note and a cartridge that accommodates the repositionable note and is coupled to the printer, and the cartridge includes an indication unit that indicates color information previously defined for the repositionable note accommodated in the cartridge or a remaining amount of the repositionable note accommodated in the cartridge, and the color information of the repositionable note or the remaining amount of the repositionable note is expressed as a binary number, and the indication unit includes one or more indicator channels for indicating respective digits of the binary number, and each of the one or more indicator channels indicates 0 or 1, and the printer includes a sensing unit including one or more sensing channels which are matched with the respective one or more indicator channels and configured to sense the respective digits of the binary number indicated by the one or more indicator channels. The printer system uses the one or more sensing channels to obtain a binary number that expresses color information of the repositionable note or a remaining amount of the repositionable note, and obtains color information of the repositionable note from the binary number. The printer system includes a means for measuring a weight of the cartridge. If a binary number expressing a remaining amount of the repositionable note is not obtained, the printer system measures a weight of the cartridge and uses the measured weight of the cartridge to estimate a remaining amount of the repositionable note accommodated in the cartridge.

Further, the printer system includes a printer that recognizes a color of a repositionable note accommodated in the printer and sets a Bluetooth search name according to the color of the repositionable note, and the Bluetooth search name includes a name field indicating a name of the printer and a color field indicating a color of the repositionable note accommodated in the printer. If the repositionable note accommodated in the printer is replaced with a repositionable note of another color, the printer recognizes the color of the replaced repositionable note and changes the color field of the Bluetooth search name according to the color of the replaced repositionable note. The printer system includes a user client that can be linked to the printer via Bluetooth and linked to a predetermined printer by using the Bluetooth search name and obtains information about colors of repositionable notes accommodated in one or more printers by using color fields of Bluetooth search names of the respective one or more printers, displays the colors of the repositionable notes accommodated in the respective one or more printers, receives an input to select a color of a repositionable note from a user, selects a printer that accommodates a repositionable note of the color selected by the user by using the color fields of the respective one or more printers and is linked to the selected printer and allows the linked printer to perform printing.

Details of other embodiments will be included in the detailed description and the accompanying drawings.

Effects of the Invention

According to embodiments of the present disclosure, even if Bluetooth classic which is an earlier version of Bluetooth 4.0 and unsuitable for bidirectional communication is used before pairing, it is possible to obtain information about a color of a repositionable note from a printer.

Therefore, it is possible to easily select a printer that accommodates a repositionable note of a color desired by a user client or a user.

Further, various means capable of sensing a color of a repositionable note accommodated in a cartridge can be provided. Therefore, it is possible for a user to easily select a printer that can print a repositionable note of a desired color.

Furthermore, it is possible to effectively sense a color of a repositionable note accommodated in a cartridge, and, thus, it is possible to replace and use cartridges that accommodate repositionable notes of various colors in a single printer. A user can check a color of a repositionable note accommodated in a cartridge mounted in a printer without opening the cartridge.

However, effects of the present disclosure are not limited to the above-described effects. Although not described herein, other effects of the present disclosure can be clearly understood by those skilled in the art from the following descriptions.

BRIEF DESCRIPTION OF THE DRAWINGS

FIG. 15 is a diagram illustrating an example where a printer prints an edit screen according to a direction of an adhesive portion locator.

FIG. 26 is a diagram showing an example of conducting a meeting by using a repositionable note printed through a printer.

BEST MODE FOR CARRYING OUT THE INVENTION

Figure 1:
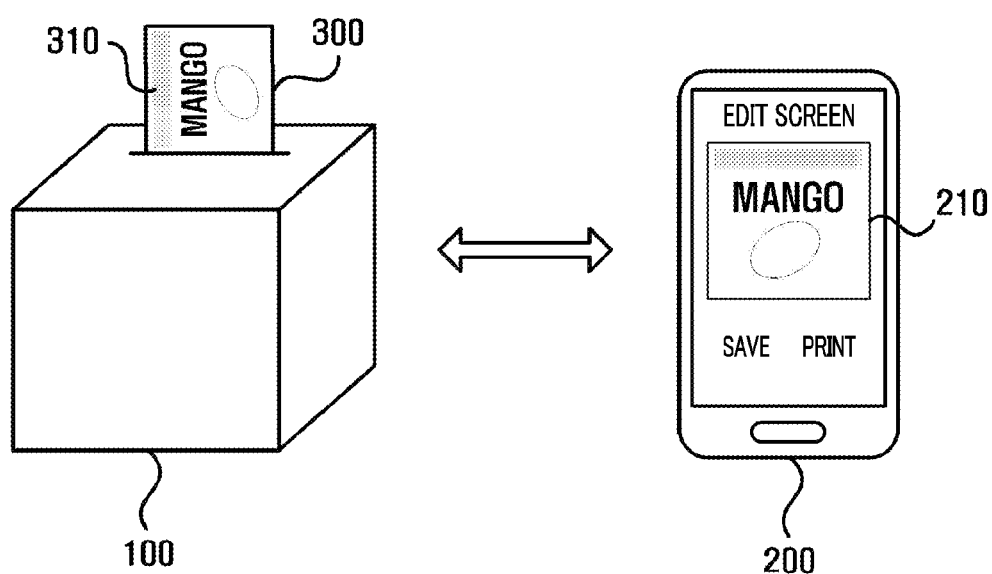
FIG. 1 is a diagram illustrating a printer system for printing a repositionable note according to an embodiment of the present disclosure.

The advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide those skilled in the art to which the present disclosure pertains with the category of the invention, and the present disclosure will be defined by the appended claims.

The terms used herein are provided only for illustration of the exemplary embodiments but not intended to limit the present disclosure. As used herein, the singular terms include the plural reference unless the context clearly indicates otherwise. The terms "comprises" and/or "comprising" specify the presence of stated components but do not preclude the presence or addition of one or more other components. Throughout the whole specification, the same reference numerals denote the same elements, and the term "and/or" includes any and all combinations of one or more of the stated components. Although the terms "first", "second", and the like are used for describing various components, these components are not confined by these terms. These terms are merely used for distinguishing one component from the other components. Therefore, a first component to be mentioned below may be a second component in a technical concept of the present disclosure.

Unless otherwise defined, all terms (including technical and scientific terms) used herein have the same meaning as commonly understood by those skilled in the art to which this invention belongs. It will be further understood that terms defined in commonly used dictionaries should not be interpreted in an idealized or overly formal sense unless expressly so defined herein.

In the present disclosure, a printer may be used as linked to a user client. The user client may include a mobile device and a personal computer, but is not limited thereto.

The printer may be linked to the user client in a wireless manner via a communication network such as Bluetooth, WiFi or 3G, and LTE. Otherwise, the printer may be linked to the user client in a wired manner by using a USB or a 5-pin, 8-pin or C-type cable. A method for linking the printer and the user client is not limited. However, for convenience in explanation, it is assumed in the embodiments described herein that the printer and the user client are linked via Bluetooth.

FIG. 1 is a diagram illustrating a printer system for printing a repositionable note according to an embodiment of the present disclosure. FIG. 1 illustrates a printer 100 and a user client 200.

The printer 100 prints a repositionable note 300. The repositionable note 300 includes a repositionable adhesive portion 310 on its one surface.

In the repositionable note 300, a surface on which images or texts are printed is different from the surface on which the repositionable adhesive portion 310 is included. That is, in the repositionable note 300 illustrated in FIG. 1, the repositionable adhesive portion 310 included on its one surface is positioned on a back surface of the repositionable note 300 illustrated in FIG. 1.

In the present disclosure, for convenience in explanation, the repositionable adhesive portion 310 provided on the back surface of the repositionable note 300 is illustrated on a front surface of the repositionable note 300. However, such illustration is provided only for showing the position of the repositionable adhesive portion 310, but the repositionable adhesive portion 310 is not actually provided on the front surface of the repositionable note 300.

The user client 200 is paired with the printer 100 via Bluetooth. The user client 200 may display an edit screen 210 of an image to be printed by the printer 100. The edit screen 210 may include an interface for editing an image or text to be printed by the printer 100.

The user client 200 may transmit the image displayed in the edit screen 210 to the printer 100. The printer 100 may print and output the transmitted image.

Figure 2:
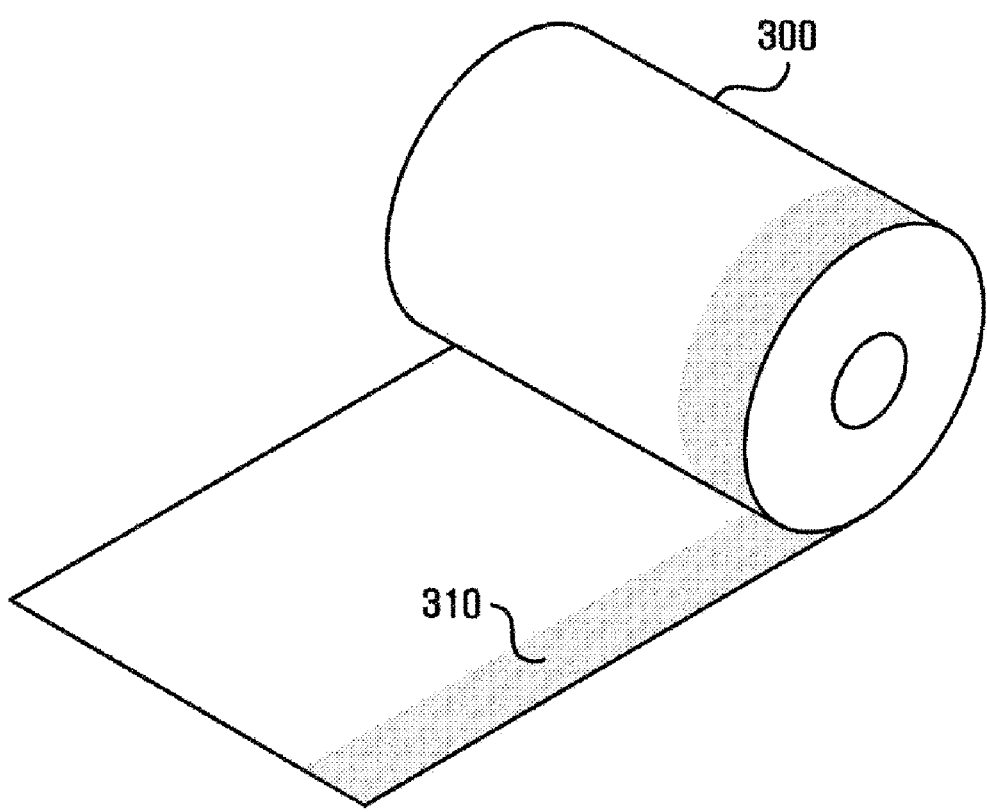
FIG. 2 is a diagram illustrating a repositionable note in the form of a roll according to an embodiment of the present disclosure.

In an embodiment, the repositionable note 300 may be configured in the form of a roll including the repositionable adhesive portion 310 on its one surface. FIG. 2 illustrates the repositionable note 300 configured in the form of a roll according to an embodiment.

Figure 3:
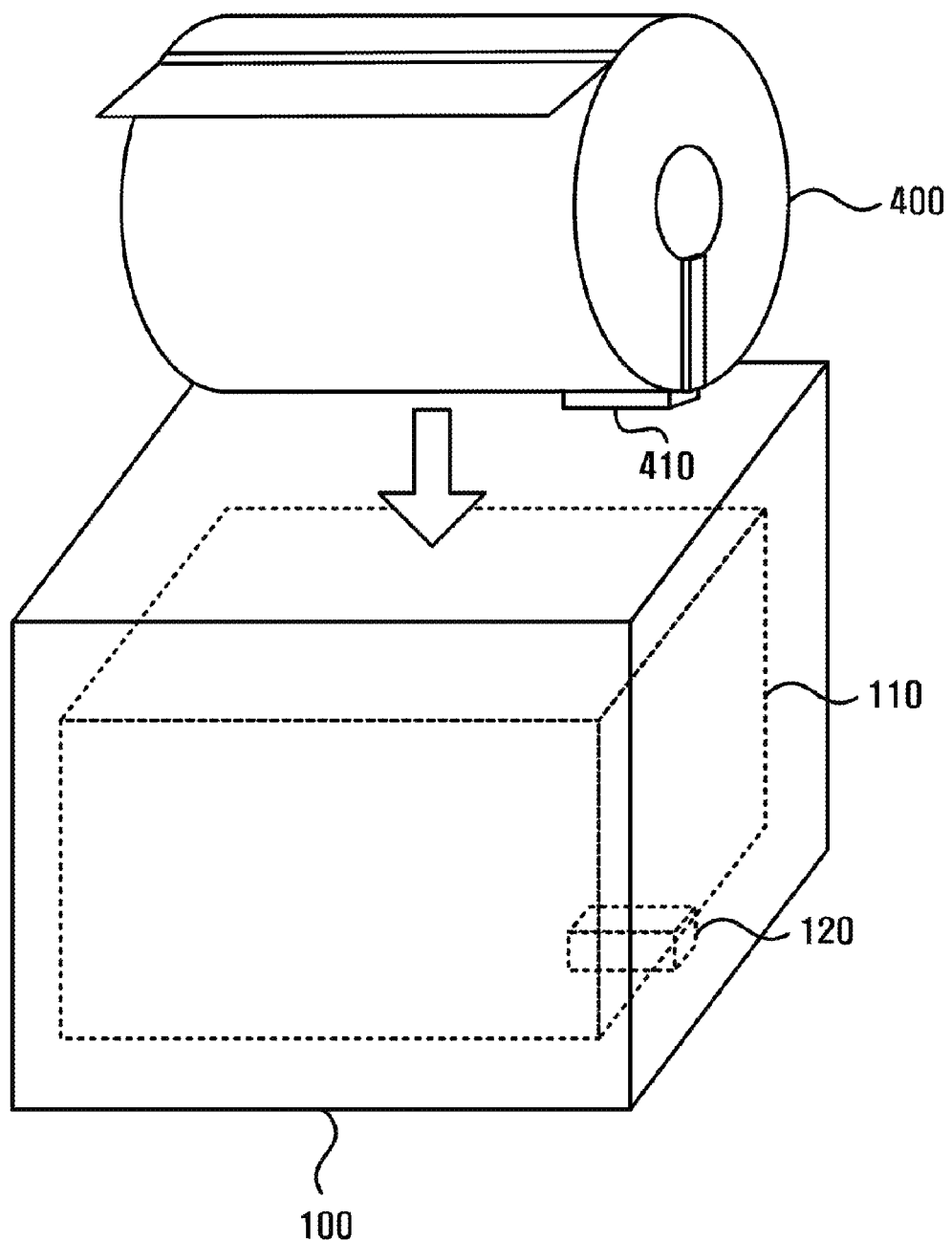
FIG. 3 is a diagram illustrating an example where a cartridge accommodating a repositionable note is mounted in a printer.

The repositionable note 300 configured in the form of a roll as shown in FIG. 2 is accommodated in a cartridge and mounted in the printer 100. FIG. 3 illustrates an example where a cartridge 400 accommodating the repositionable note 300 is mounted in the printer 100.

In an embodiment, the cartridge 400 may include an indication unit 410 that indicates color information previously defined for the repositionable note 300 accommodated in the cartridge 400. The indication unit 410 of the cartridge 400 includes one or more indicator channels configured to indicate color information of the repositionable note 300 accommodated in the cartridge 400.

In an embodiment, color information of the repositionable note 300 is expressed as a previously defined value. For example, white, yellow, and green may be defined as 1, 2, and 3, respectively. The indication unit 410 includes the one or more indicator channels configured to express previously defined values.

Further, a cartridge accommodation unit 110 of the printer 100 may include a sensing unit 120 that senses color information of the repositionable note 300 indicated by the indication unit 410 of the cartridge 400.

A sensing unit 120 of the printer 100 includes one or more sensing channels which are matched with the one or more indicator channels included in the indication unit 410 and configured to sense color information of the repositionable note 300 indicated by the respective one or more indicator channels included in the indication unit 410.

FIG. 4 to FIG. 7 are diagrams illustrating indicator channels and sensing channels according to an embodiment of the present disclosure.

In an embodiment, the indication unit 410 of the cartridge 400 includes one or more indicator channels 412 to 418. Further, the sensing unit 120 of the printer 100 includes one or more sensing channels 122 to 128.

The numbers and shapes of the indicator channels and the sensing channels illustrated in FIG. 4 to FIG. 7 are provided for example only, and the number of the indicator channels to be included in the indication unit 410, the number of the sensing channels to be included in the sensing unit 120, and the shapes of the indictor channels and the sensing channels, respectively, are not limited thereto.

In an embodiment, the color information of the repositionable note 300 may be defined as a binary number. Each of the one or more indicator channels 412 to 418 included in the indication unit 410 of the cartridge 400 may indicate 0 or 1 representing each digit of the binary number that expresses the color information of the repositionable note 300.

Each of the one or more sensing channels included in the sensing unit 120 of the printer 100 may sense each digit of the binary number that expresses the color information of the repositionable note 300 indicated by each of the one or more indicator channels 412 to 418 included in the indication unit 410 of the cartridge 400.

The sensing unit 120 of the printer 100 uses the one or more sensing channels 122 to 128 to obtain binary numbers that express color information of the repositionable note 300 indicated by the one or more indicator channels 412 to 418 included in the indication unit 410 of the cartridge 400. The printer 100 may obtain the color information of the repositionable note 300 accommodated in the cartridge 400 from the obtained binary numbers.

The color information of the repositionable note 300 may be expressed as a number. For example, white, yellow, and green may be expressed as 1, 2, and 3, respectively. Further, the respective numbers may be converted into binary numbers. Referring to FIG. 4 to FIG. 7, the color information of the repositionable note 300 may be expressed as a four digit binary number. In this case, white, yellow, and green may be expressed as 0001, 0010, and 0011, respectively.

A method of expressing color information as a number and digits of each number are provided for example only and are not limited to the examples described in the present disclosure.

In an embodiment, the indication unit 410 of the cartridge 400 and the sensing unit 120 of the printer 100 may employ a photointerrupter.

Figure 4:
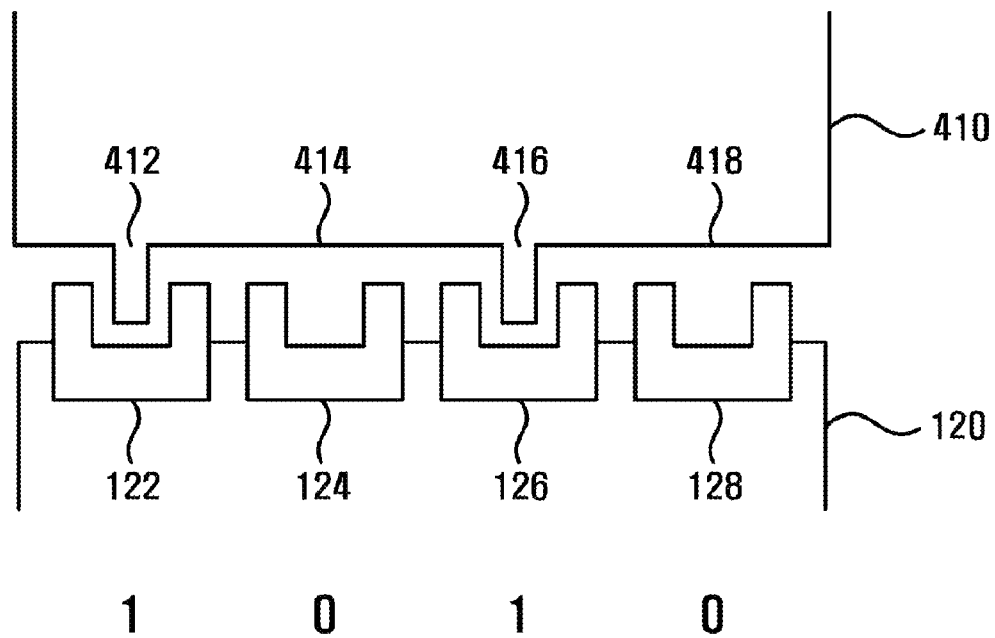
FIG. 4 to FIG. 7 are diagrams illustrating indicator channels and sensing channels according to an embodiment of the present disclosure.

Referring to FIG. 4, each of the one or more sensing channels 122 to 128 of the sensing unit 120 may be configured as a photointerrupter including a light emitting diode Z and a phototransistor. The photointerrupter may sense whether or not the phototransistor receives light of the light emitting diode.

The respective one or more indicator channels 412 to 418 of the indication unit 410 may include means for blocking light receiving of the phototransistors included in the respective one or more sensing channels 122 to 128 according to the values indicated by the respective one or more indicator channels 412 to 418.

For example, if each of the one or more indicator channels 412 to 418 indicates 1, they include the means for blocking light receiving of the phototransistors, and if each of the one or more indicator channels 412 to 418 indicates 0, they may not include the means for blocking light receiving of the phototransistors.

Each of the means for blocking light receiving of the phototransistors may be configured as a protrusion which is inserted between the light emitting diode and the phototransistor of the photointerrupter to block light of the light emitting diode. However, the configuration and shape thereof are not limited thereto.

In an embodiment, the protrusion is formed when the cartridge 400 is produced, and the shape thereof may not be changed.

In another embodiment, the protrusion may be configured to be inserted into and ejected from the cartridge 400. Therefore, the protrusion may be changed in shape depending on color information of the repositionable note 300 accommodated in the cartridge 400. For example, a user may replace the repositionable note 300 accommodated in the cartridge 400.

If the repositionable note 300 accommodated in the cartridge 400 is replaced with a repositionable note of another color, the user may allow the protrusion to be inserted or ejected to change the color information indicated by the indication unit 410 of the cartridge 400 with color information of the replaced repositionable note.

In an embodiment, the cartridge 400 may use a senor capable of sensing a color to sense a color of a repositionable note accommodated in the cartridge 400 and allow the protrusions of the respective indicator channels to be inserted or ejected to express the sensed color information.

The respective one or more sensing channels 122 to 128 of the sensing unit 120 may sense numbers indicated by the respective one or more indicator channels 412 to 418 according to whether the phototransistors included in the respective one or more sensing channels 122 to 128 receive light or not.

FIG. 4 illustrate an example where the sensing unit 120 obtains a binary number 1010 from the indication unit 410.

In an embodiment, the indication unit 410 of the cartridge 400 and the sensing unit 120 of the printer 100 may use a resistor element.

Figure 5:
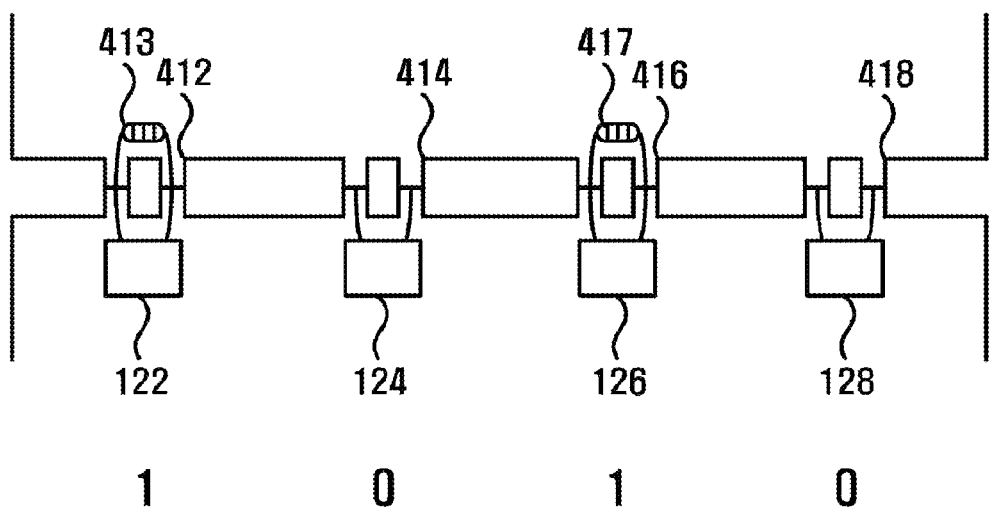

Referring to FIG. 5, each of the one or more sensing channels 122 to 128 of the sensing unit 120 may include a means for measuring a resistance. For example, each of the one or more sensing channels 122 to 128 of the sensing unit 120 may include a means for applying a predetermined voltage or current or a means for measuring a voltage or current.

Each of the one or more indicator channels 412 to 418 of the indication unit 410 may include a resistor element that has different resistances depending on the numbers indicated by the respective one or more indicator channels 412 to 418. In an embodiment, whether or not each of the one or more indicator channels 412 to 418 of the indication unit 410 includes a resistor element may be determined depending on a number indicated by each of the one or more indicator channels 412 to 418.

For example, if each of the one or more indicator channels 412 to 418 indicates 1, they include resistor elements, and if each of the one or more indicator channels 412 to 418 indicates 0, they may not include the resistor elements.

Further, each of the one or more indicator channels 412 to 418 and each of the one or more sensing channels 122 to 128 may include a pair of electrodes which can be brought into contact with each other.

A pair of electrodes of an indicator channel without a resistance may be short-circuited and may be connected to a conductor without a resistance.

Each of the one or more sensing channels 122 to 128 may use a pair of electrodes in contact with each other to measure a resistance. The sensing unit 120 may sense numbers indicated by the respective one or more indicator channels 412 to 418 depending on resistances sensed by the one or more sensing channels 122 to 128.

FIG. 5 illustrate an example where the sensing unit 120 obtains a binary number 1010 from the indication unit 410.

In an embodiment, the indication unit 410 of the cartridge 400 and the sensing unit 120 of the printer 100 may use a current.

Referring to FIG. 5, each of the one or more sensing channels 122 to 128 of the sensing unit 120 may include a means for sensing a current. In an embodiment, each of the one or more sensing channels 122 to 128 of the sensing unit 120 may include a means for measuring the intensity of a current.

Each of the one or more indicator channels 412 to 418 of the indication unit 410 may include a means for allowing different currents to pass through depending on the numbers indicated by the respective one or more indicator channels 412 to 418. In an embodiment, each of the one or more indicator channels 412 to 418 of the indication unit 410 may be set to allow a current to pass through or not to pass through depending on a number indicated by each of the one or more indicator channels 412 to 418.

For example, if each of the one or more indicator channels 412 to 418 indicates 1, they may allow a current to pass through, and if each of the one or more indicator channels 412 to 418 indicates 0, they may not allow a current to pass through.

Further, each of the one or more indicator channels 412 to 418 and each of the one or more sensing channels 122 to 128 may include electrodes which can be brought into contact with each other.

Each of the one or more sensing channels 122 to 128 may use the electrodes in contact with each other to sense a current or measure the intensity of a current. The sensing unit 120 may sense a number indicated by each of the one or more indicator channels 412 to 418 depending on the current sensed by each of the one or more sensing channels 122 to 128.

Figure 6:
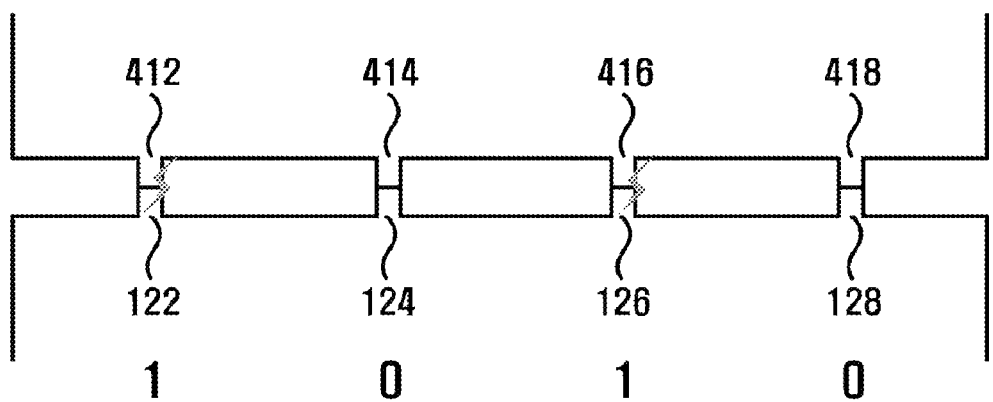

FIG. 6 illustrates an example where the sensing unit 120 obtains a binary number 1010 from the indication unit 410.

In an embodiment, the indication unit 410 of the cartridge 400 and the sensing unit 120 of the printer 100 may use a hall sensor and a magnet.

Figure 7:
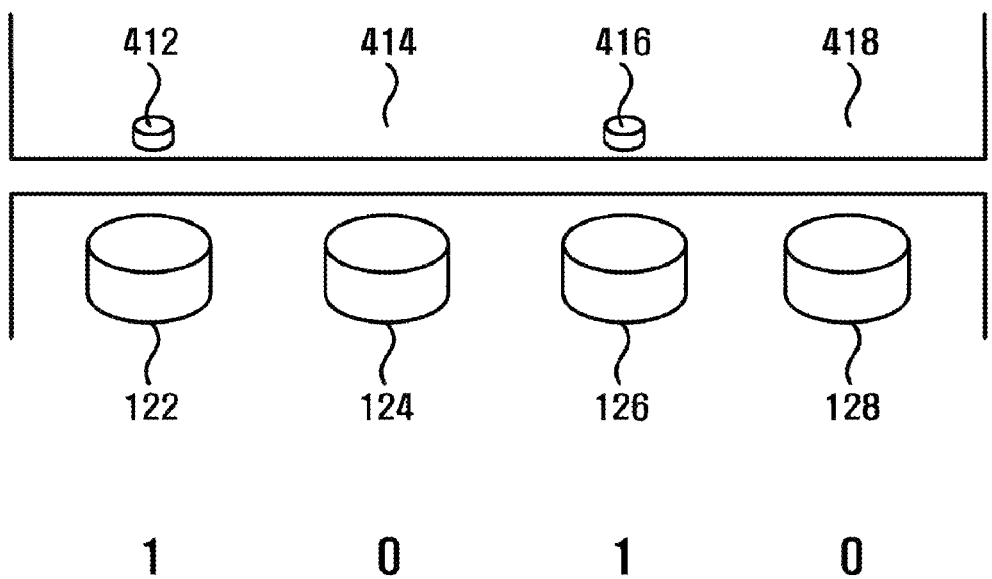

Referring to FIG. 7, each of the one or more sensing channels 122 of the sensing unit 120 may include a hall sensor.

Each of the one or more indicator channels 412 to 418 of the indication unit 410 may include a magnet depending on a number indicated by each of the one or more indicator channels 412 to 418.

For example, if each of the one or more indicator channels 412 to 418 indicates 1, they may include magnets of the phototransistors, and if each of the one or more indicator channels 412 to 418 indicates 0, they may not include the magnets.

Each of the one or more sensing channels 122 to 128 of the sensing unit 120 may use a hall sensor to sense the number indicated by each of the one or more indicator channels 412 to 418.

If the hall sensor is used, the sensing unit 120 and the indication unit 410 do not need to be brought into physical contact with each other.

FIG. 7 illustrates an example where the sensing unit 120 obtains a binary number 1010 from the indication unit 410.

The indication unit 410 of the cartridge 400 and the sensing unit 120 of the printer 100 may indicate color information of the repositionable note 300 by using various other methods.

For example, each of the one or more sensing channels 122 to 128 of the sensing unit 120 may include a mechanical switch.

The respective one or more indicator channels 412 to 418 of the indication unit 410 may include protrusions configured to press the mechanical switches included in the sensing channels depending on the numbers indicated by the respective one or more indicator channels 412 to 418.

For example, if each of the one or more indicator channels 412 to 418 indicates 1, they may include protrusions, and if each of the one or more indicator channels 412 to 418 indicates 0, they may not include the protrusions.

The respective one or more sensing channels 122 to 128 of the sensing unit 120 may use the mechanical switches to sense the numbers indicated by the respective one or more indicator channels 412 to 418.

In another embodiment, the color information of the repositionable note 300 may be expressed in another form. For example, the color information of the repositionable note 300 may be expressed as a quaternary number, a decimal number, or a hexadecimal number. Each of the one or more indicator channels 412 to 418 included in the indication unit 410 of the cartridge 400 may indicate each digit of a quaternary number, a decimal number, or a hexadecimal number that expresses the color information of the repositionable note 300.

Each of the one or more sensing channels included in the sensing unit 120 of the printer 100 may sense each digit of a quaternary number, a decimal number, or a hexadecimal number that expresses the color information of the repositionable note 300 indicated by each of the one or more indicator channels 412 to 418 included in the indication unit 410 of the cartridge 400.

For example, each of the one or more indicator channels 412 to 418 may indicate each digit of a quaternary number, a decimal number, or a hexadecimal number based on the intensity of a current flowing from each of the indicator channels 412 to 418, the value of a resistance of each of the indicator channels 412 to 418, or magnetic force of the magnet included in each of the indicator channels 412 to 418.

The one or more sensing channels included in the sensing unit 120 of the printer 100 may obtain color information of the repositionable note 300 from the respective one or more indicator channels 412 to 418.

Further, the printer 100 may receive information about a remaining amount of the repositionable note 300 from the cartridge 400. For example, each of the one or more indicator channels 412 to 418 of the cartridge 400 may be set to indicate information about a remaining amount of the accommodated repositionable note 300.

For example, some of the one or more indicator channels 412 to 418 may indicate color information of the repositionable note 300 and some of the others may indicate information about a remaining amount of the repositionable note 300. For another example, each of the one or more indicator channels 412 to 418 may indicate each digit of a binary number, a quaternary number, a decimal number, or a hexadecimal number which is a combination of color information and information about a remaining amount of the repositionable note 300.

For another example, the printer 100 may include a means for measuring a weight of the cartridge 400 accommodated in the cartridge accommodation unit 110. The printer 100 may estimate a remaining amount of the repositionable note 300 accommodated in the cartridge 400 based on a weight of the cartridge 400.

In an embodiment, the printer 100 may include a display unit configured to display recognized color information of the repositionable note 300.

Figure 8:
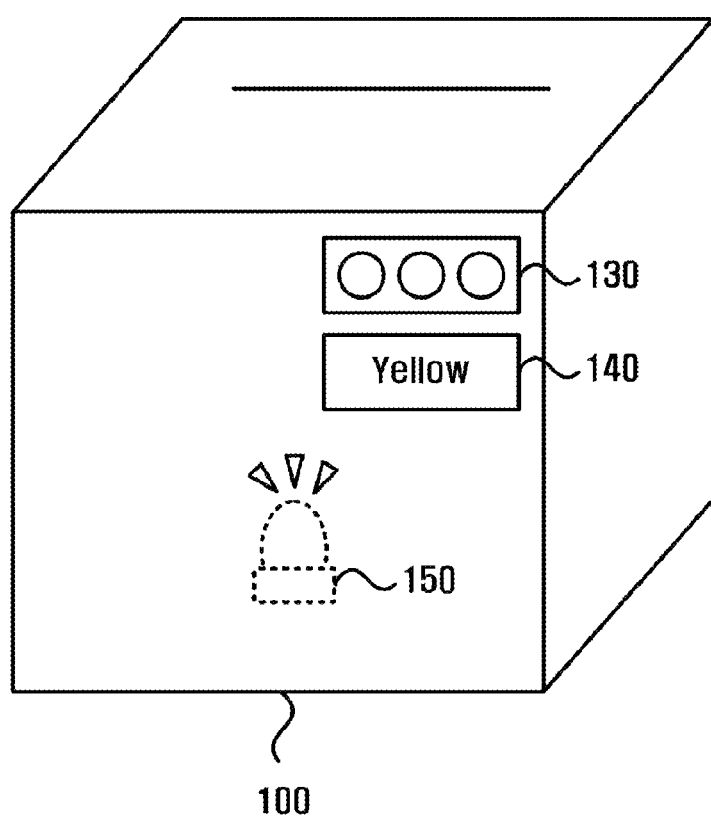
FIG. 8 is a diagram showing a method for displaying color information of a repositionable note by a printer according to an embodiment of the present disclosure.

FIG. 8 is a diagram showing a method for displaying color information of a repositionable note by a printer according to an embodiment of the present disclosure.

In an embodiment, the printer 100 may include an LED display unit 130 configured to display recognized color information of the repositionable note 300 on the outside of the printer 100. For example, the LED display unit 130 may include white, yellow and green LEDs and turns on an LED corresponding to the recognized color information of the repositionable note 300.

In another embodiment, the LED display unit 130 may be configured as a lighting apparatus capable of displaying various colors. The LED display unit 130 may display a color corresponding to the recognized color information of the repositionable note 300.

In an embodiment, the printer 100 may include a display 140 configured to display the recognized color information of the repositionable note 300. The display 140 may display a color corresponding to the recognized color information of the repositionable note 300. Further, the display 140 may display the recognized color of the repositionable note 300 as text.

In an embodiment, the printer 100 may include a lighting apparatus 150 configured to display the recognized color of the repositionable note 300 on the inside of the printer 100. Further, a housing of the printer 100 may be formed of a material that transmits light of the lighting apparatus 150. For example, the housing of the printer 100 may be formed of a white plastic material that is opaque but transmits light of the lighting apparatus 150.

Therefore, the housing of the printer 100 may be outwardly changed in color to the recognized color of the repositionable note 300.

Figure 9:
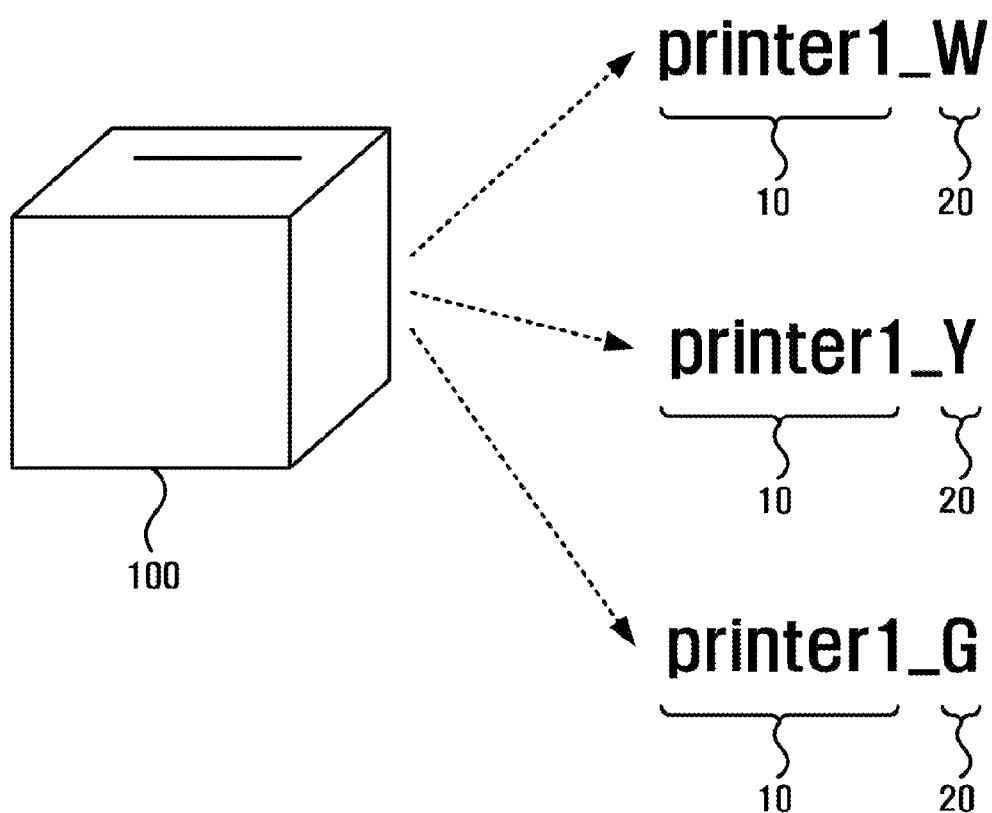
FIG. 9 is a diagram illustrating an example of a method for changing a Bluetooth search name by a printer according to an embodiment of the present disclosure.

FIG. 9 is a diagram illustrating an example of a method for changing a Bluetooth search name by a printer according to an embodiment of the present disclosure.

In an embodiment, the printer 100 may recognize a color of the repositionable note 300 for printing and change a Bluetooth search name according to the recognized color of the repositionable note 300 for printing.

In an embodiment, the Bluetooth search name of the printer 100 may include a name field 10 indicating a name of the printer 100 and a color field 20 indicating a color of the repositionable note for printing.

For example, the name of the printer 100 may be printer1. The name field 10 of the Bluetooth search name is not changed by a change in color of the repositionable note 300 for printing and may be used for searching the printer 100.

The color field 20 may represent a color of the repositionable note 300 accommodated in the printer 100. For example, if the color of the repositionable note 300 is white, yellow, or green, W, Y, or G may be displayed respectively. However, a method of representing the color of the repositionable note 300 in the color field 20 is not limited thereto.

Figure 10:
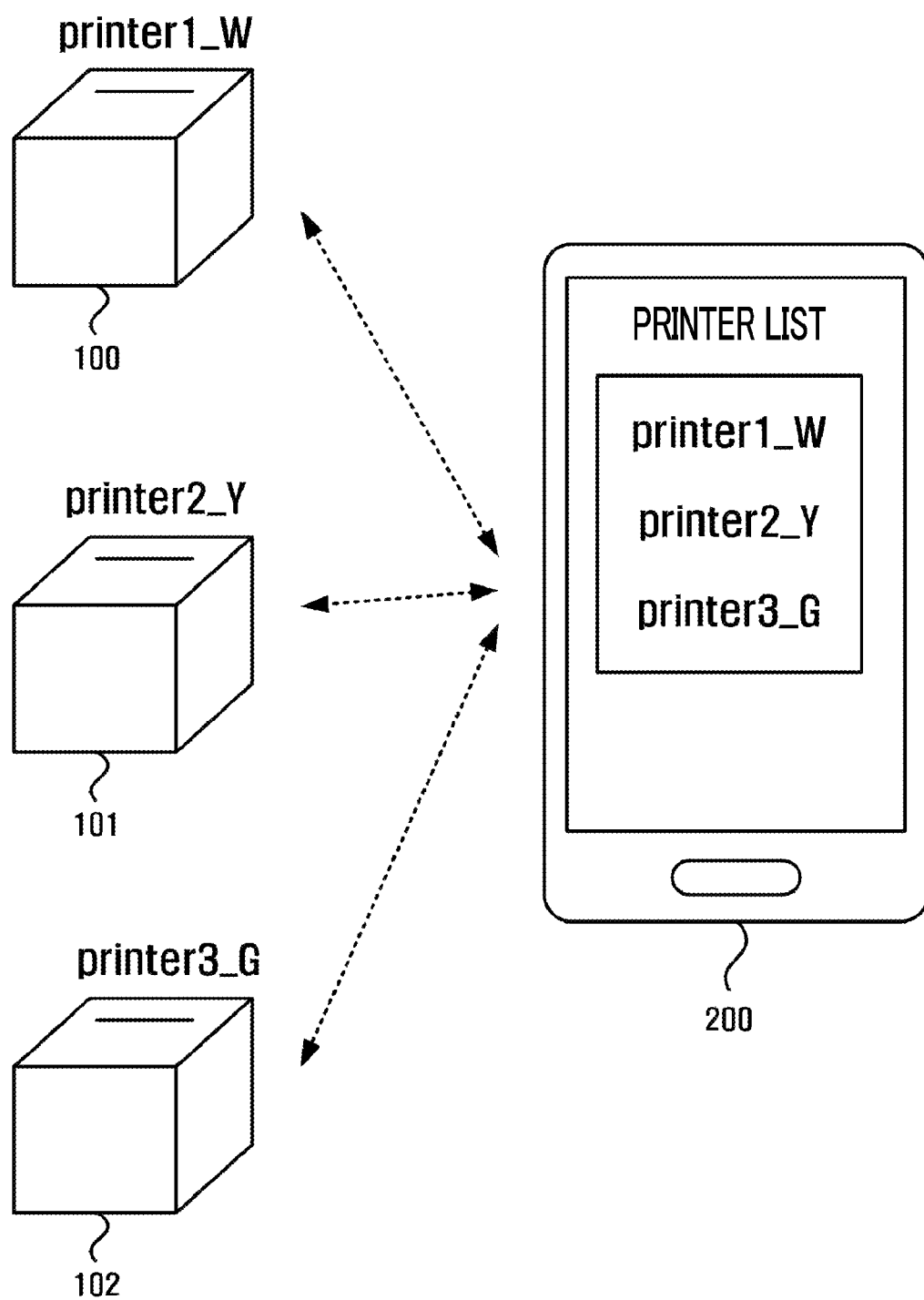
FIG. 10 is a diagram illustrating an example where a Bluetooth search name of a printer is displayed on a user client.

FIG. 10 is a diagram illustrating an example where a Bluetooth search name of a printer is displayed on a user client.

FIG. 10 illustrates the user client 200 and three printers 100, 101, and 102. According to an embodiment illustrated in FIG. 10, the names of the three printers 100, 101, and 102 are printer1, printer2, and printer3, respectively.

Further, each of the printer1 100, the printer2 101, and the printer3 102 accommodates a white repositionable note 300, a yellow repositionable note 300, and a green repositionable note 300, respectively.

Therefore, a Bluetooth search name of the printer1 100 is printer1_W, a Bluetooth search name of the printer2 101 is printer2_Y, and a Bluetooth search name of the printer3 102 is printer3_G.

The user client 200 may search Bluetooth devices around itself. On the user client 200, printer1_W, printer2_Y, and printer3_G which are the Bluetooth search names of the printers 100 to 102 may be displayed.

The user may select a printer capable of printing a repositionable note of a desired color with reference to the Bluetooth search names displayed on the user client 200.

In an embodiment, the user client 200 may store pairing information of the printers 100 to 102 or perform pairing. The user client 200 may also perform pairing simultaneously with the printers 100 to 102.

Figure 11:
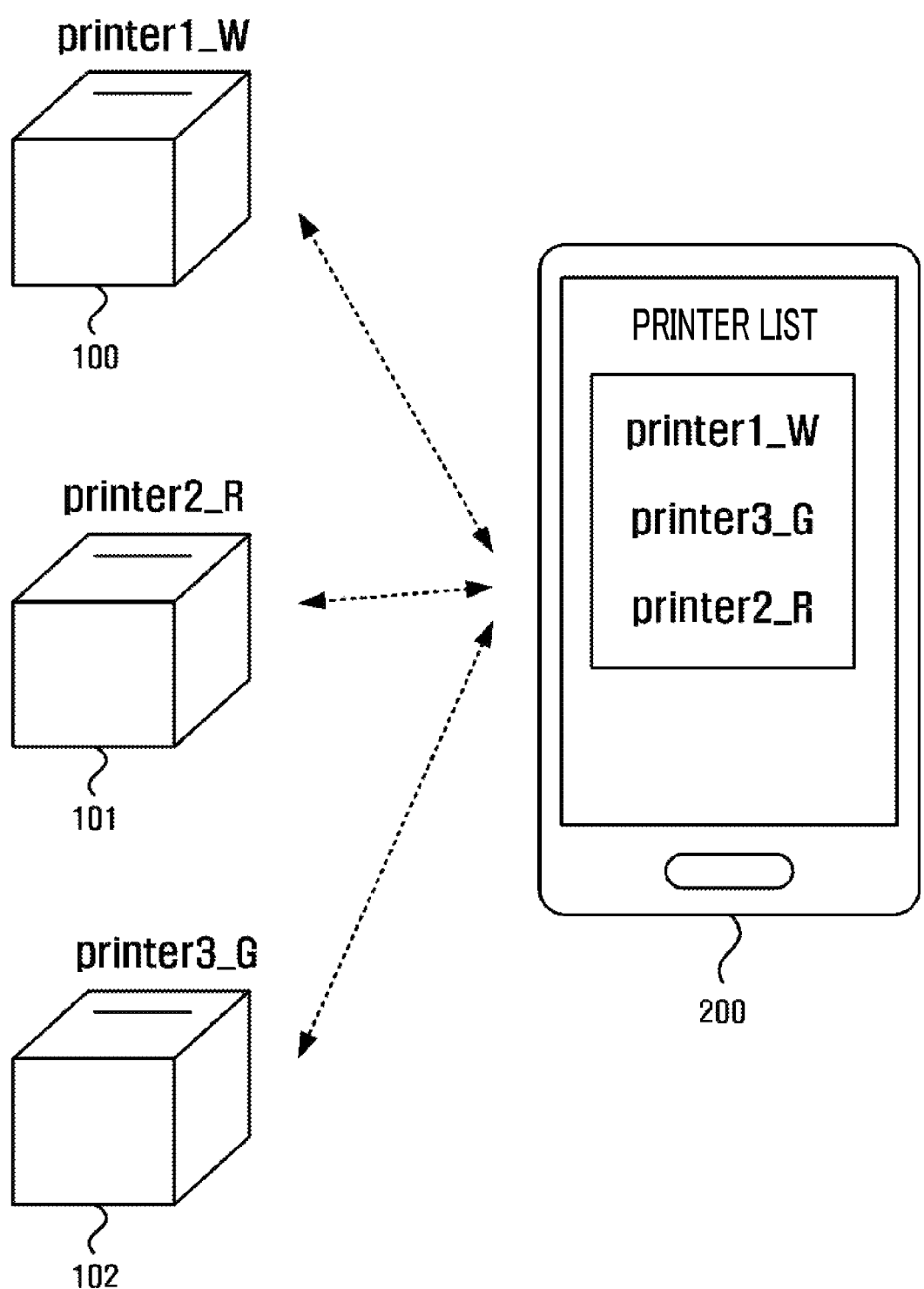
FIG. 11 is a diagram illustrating an example of changing a Bluetooth search name of a printer.

FIG. 11 is a diagram illustrating an example of changing a Bluetooth search name of a printer.

In an embodiment, the repositionable note 300 accommodated in the printer 101 may be replaced. For example, a yellow repositionable note accommodated in the printer 101 may be replaced with a red repositionable note.

The printer 101 may recognized a color of the replaced repositionable note and change the color field of the Bluetooth search name. For example, the printer 101 may change the Bluetooth search name with printer2_R.

In an embodiment, when the Bluetooth search name of the printer 101 is changed, the user client 200 obtains the changed Bluetooth search name of the printer 101. The user client 200 may change the existing Bluetooth search name of the printer 101 with the obtained Bluetooth search name.

In another embodiment, when the Bluetooth search name of the printer 101 is changed, the printer 101 may disconnect itself from the user client 200. The user client 200 may use the name field (printer2) of the printer 101 to perform Bluetooth search again. Even if the Bluetooth search name of the printer 101 is changed, the name field of the Bluetooth search name of the printer 101 is not changed. Therefore, the user client 200 can find the printer 101.

The user client 200 may perform pairing again with the printer 101 which has the changed Bluetooth search name. Therefore, printer2_Y may be deleted from the printer list displayed on the user client 200 and printer2_R may be added thereto.

In an embodiment, all of the printers whose pairing information is stored may be displayed in the printer list. Further, only the printer which is currently paired may be displayed in the printer list.

If only the printer which is currently paired is displayed in the printer list, when pairing with the printer 101 is canceled, printer2_Y may be deleted from the list. Further, when pairing with the printer 101 is performed again, printer2_R may be added to the list.

If all of the printers whose pairing information is stored are displayed in the printer list, even when pairing with the printer 101 is canceled, printer2_Y is not deleted from the list. In this case, it is possible to set a Bluetooth search name of a printer to be deleted when pairing with the printer is canceled. If so, however, pairing information needs to be searched and stored again to link again.

Therefore, the user client 200 may be set not to delete a Bluetooth search name from the printer list when pairing is canceled, but to delete a previously stored printer name when a printer name with the same name field and a different color field is added later.

For example, if printer2_R is searched and added to the printer list, printer2_Y may be deleted to avoid confusion of the user.

Figure 12:
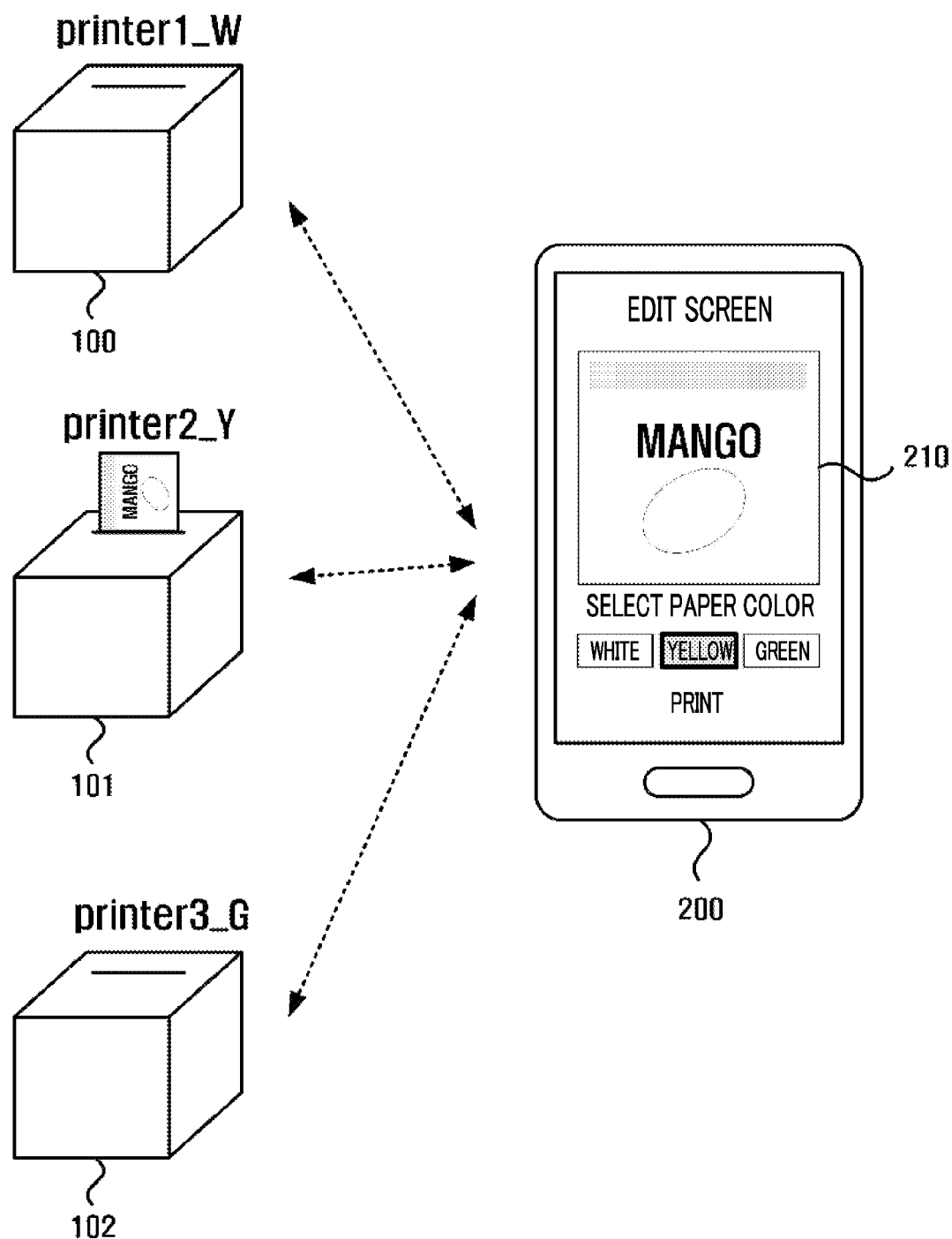
FIG. 12 is a diagram illustrating an example where a user client selects a printer based on a color.

FIG. 12 is a diagram illustrating an example of displaying an adhesive portion in an edit area displayed on a user client.

In an embodiment, the user client 200 displays an edit screen 210 of an image to be printed by a printer. The user may use the edit screen 210 displayed on the user client 200 to create an image or text to be printed on a repositionable note by the printer. If the user client 200 is linked to multiple printers that accommodate repositionable notes of different colors, respectively, the user client 200 may select a printer that accommodates a repositionable note of a desired color.

In an embodiment, the user may select a printer capable of printing a repositionable note of a desired color from the printer list illustrated in FIG. 10 to FIG. 11 by using the color fields included in the respective Bluetooth search names.

In an embodiment, the user client 200 may obtain Bluetooth search names of the printers linked thereto. The user client 200 may obtain information about colors of the repositionable notes which can be printed by the printers linked to the user client 200 by using the color fields included in the respective Bluetooth search names.

If the user wants to print the edit screen 210, the user client 200 may display a list of printable colors. Referring to FIG. 12, the user client 200 is linked to printers that can print white, yellow, and green repositionable notes, respectively.

Therefore, if the user wants to print the edit screen 210, the user client 200 may display a screen to select one of white, yellow, and green.

If the user selects a color, the user client 200 is linked to a printer corresponding to the selected color and transmits the edit screen to the linked printer to be printed.

For example, as illustrated in FIG. 12, if the user selects yellow, the user client 200 may select the printer 101 whose color field of the Bluetooth search name includes "Y". The user client 200 may transmit the edit screen to the printer 101 to be printed.

In an embodiment, the user client 200 may not be paired consistently with the printers 100 to 102. For example, the user client 200 may store pairing information of each of the printers.

If the user wants to print the edit screen 210, the user client 200 may perform pairing with the selected printer and transmit information about the edit screen 210 and information about printing. When the information is transmitted completely, the user client 200 may terminate pairing.

Therefore, in the present disclosure, the user client 200 being "linked" to a printer means a state where the user client 200 performs pairing and stores pairing information to be transmitted when the user wants to print the edit screen as well as a state where the user client 200 is paired with the printer.

Figure 13:
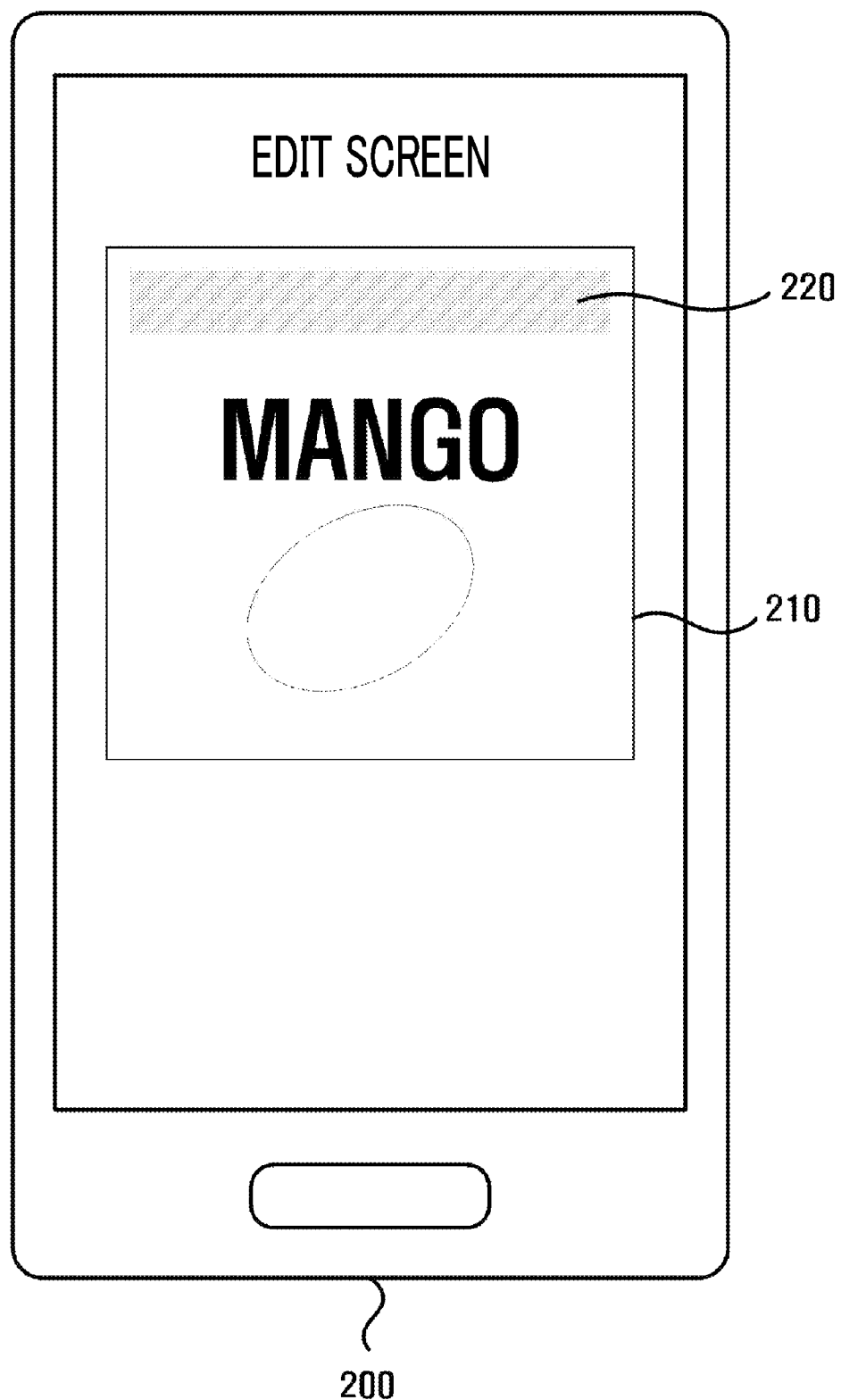
FIG. 13 is a diagram illustrating an example of displaying an adhesive portion in an edit area displayed on a user client.

FIG. 13 is a diagram illustrating an example where an adhesive portion is displayed in an edit area displayed on a user client.

In an embodiment, an adhesive portion locator 220 to indicate a location of a repositionable adhesive portion may be displayed on one side or the other side of the edit screen 210 displayed on the user client 200.

The user client 200 determines a print direction according to a location of the adhesive portion locator 220. The adhesive portion locator 220 displayed in the edit screen 210 indicates a direction in which the adhesive portion is to be located when an image included in the edit screen 210 is printed. The location of the adhesive portion locator 220 may be changed by the user.

In an embodiment, when the user client 200 transmits the information about the edit screen 210 to the printer 100, information about the location of the adhesive portion may be also transmitted to the printer 100. The printer 100 may determine a print direction of the image included in the edit screen 210 according to the location of the adhesive portion locator 220 displayed in the edit screen 210.

In an embodiment, the user client 200 may determine a print direction of the image included in the edit screen 210 according to the location of the adhesive portion locator 220 displayed in the edit screen 210. The printer 100 may print and output the image included in the edit screen 210 according to the determined print direction.

Figure 14:
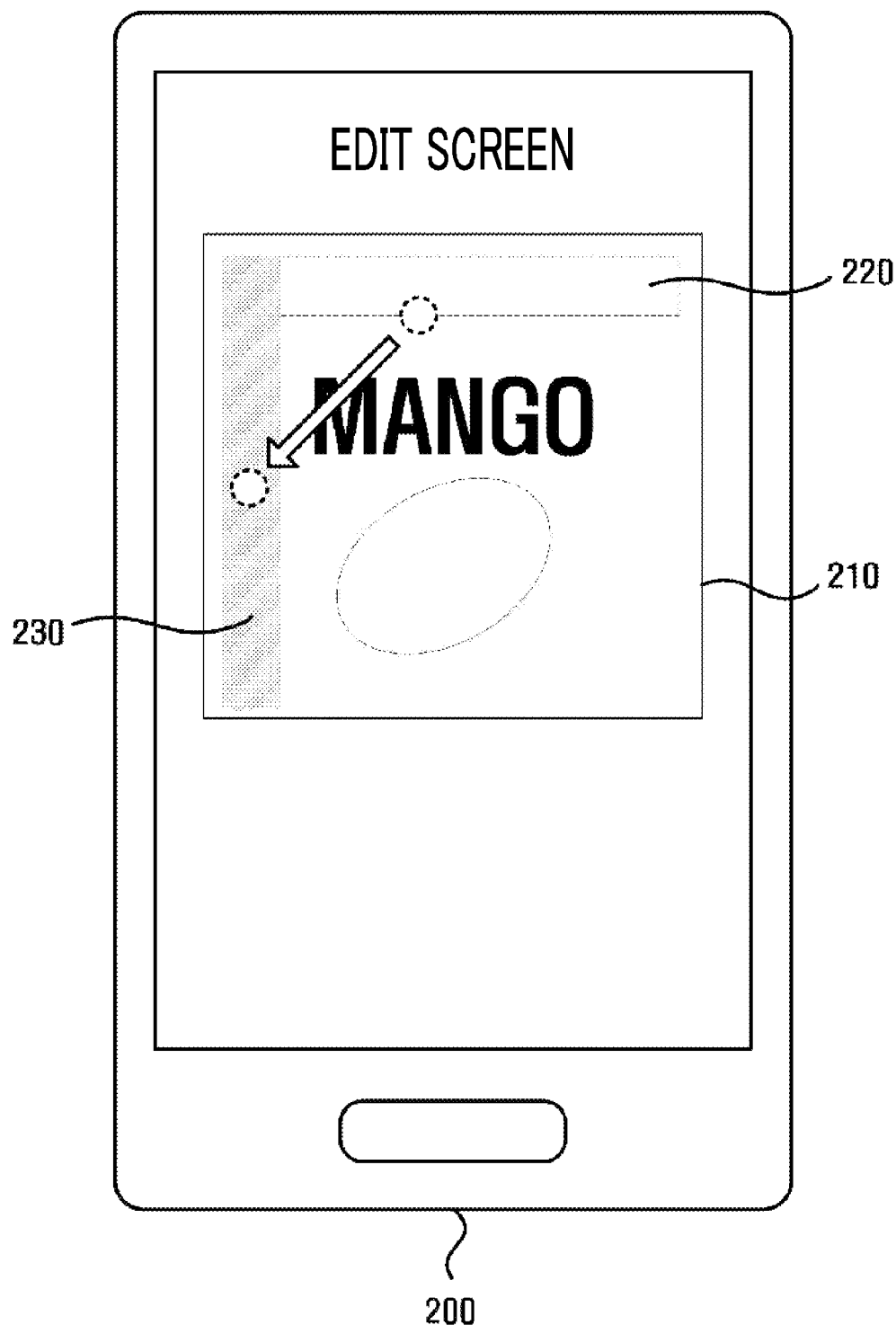
FIG. 14 is a diagram illustrating an example of changing the location of an adhesive portion displayed on a user client.

FIG. 14 is a diagram illustrating an example of changing the location of an adhesive portion displayed on a user client.

In an embodiment, the user client 200 may display the adhesive portion locator 220 on the other side of the edit screen 210 in response to a touch input of the user. FIG. 14 illustrates an adhesive portion locator 220 displayed on the other side. For example, if the user client 200 receives a touch input for a predetermined period of time at a first point of the adhesive portion locator 220 displayed in the edit screen 210, the user client 200 may be switched to an adhesive portion location change mode in which the location of the displayed adhesive portion locator 220 can be changed.

For example, the adhesive portion locator 220 displayed in the edit screen 210 may be slightly enlarged or reduced or may be displayed as if being separated by shadow effect. Further, the user client 200 may notify of mode change by short vibration. An effect of switching to the adhesive portion location change mode and a method for notifying of mode change into the adhesive portion location change mode are not limited thereto.

The user client 200 may receive a touch input to drag the adhesive portion locator 220 displayed in the edit screen 210 from the first point to a second point on the left side of the edit screen 210 from the user in the adhesive portion location change mode.

The user client 200 may display the adhesive portion locator 230 on the left side of the edit screen 210 to which the adhesive portion locator 220 has been dragged.

Likewise, the adhesive portion locator 220 may also be displayed on the right side or lower side of the edit screen 210.

In another embodiment, the user client 200 may receive the user's touch input on a region displayed in the screen of the user client 200. In response to the touch input of the user, the user client 200 may change a direction of the adhesive portion locator 220 displayed in the edit screen 210.

For example, an adhesive portion rotate button may be displayed in the screen of the user client 200. If a touch input on the adhesive portion rotate button is received, the user client 200 may change the direction of the adhesive portion locator 220 displayed in the edit screen 210 with a clockwise direction or counterclockwise direction.

The user client 200 may change a print direction of the image included in the edit screen 210 according to the changed location of the adhesive portion locator 230. The printer 100 may print and output the image included in the edit screen 210 according to the changed print direction.

FIG. 15 is a diagram illustrating an example where a printer prints an edit screen according to a direction of an adhesive portion locator.

As illustrated in FIG. 13, if the adhesive portion locator is displayed on the upper side of the edit screen 210, the printer 100 may print the repositionable note 300 in which the adhesive portion 310 is located above the image displayed in the edit screen 210.

As illustrated in FIG. 14, if the adhesive portion locator is displayed on the left side of the edit screen 210, the printer 100 may print the repositionable note 300 in which the adhesive portion 310 is located on the left of the image displayed in the edit screen 210.

Likewise, if the adhesive portion locator is displayed on the lower side of the edit screen 210, the printer 100 may print the repositionable note 300 in which the adhesive portion 310 is located under the image displayed in the edit screen 210.

Further, if the adhesive portion locator is displayed on the right side of the edit screen 210, the printer 100 may print the repositionable note 300 in which the adhesive portion 310 is located on the right the image displayed in the edit screen 210.

In an embodiment, the user client 200 may rotate the image displayed in the edit screen 210 according to the location of the adhesive portion locator displayed in the edit screen 210 and transfer the rotated image to the printer 100. The printer 100 may receive and print the rotated image.

In another embodiment, the user client 200 may transfer an unrotated image to the printer 100 together with information about a direction of the adhesive portion. The printer 100 may determine a print direction of the image based on the information about the direction of the adhesive portion and then rotate and print the image.

FIG. 16 to FIG. 20 are diagrams illustrating examples of changing the size of an edit screen and printing a repositionable note according to a change in size of the edit screen by a printer.

In an embodiment, the printer 100 may print a roll-shaped repositionable note including an adhesive portion on its one surface, and a printed length of the roll-shaped repositionable note can be changed according to a length of the edit screen 210 displayed in the screen of the user client 200.

Referring to FIG. 16 to FIG. 20, crosswise and lengthwise directions of the edit screen 210 are determined based on a location of the adhesive portion locator 220. That is, when a portion where the adhesive portion locator 220 is located is referred to as the upper side, a direction parallel to the adhesive portion locator 220 is referred to as a crosswise direction and a direction orthogonal to the adhesive portion is referred to as a lengthwise direction.

Further, referring to FIG. 16 to FIG. 20, crosswise and lengthwise directions of the repositionable note 300 printed by the printer 100 are also determined based on the adhesive portion 310. That is, when a portion where the adhesive portion 310 is located is referred to as the upper side, a direction parallel to the adhesive portion 310 is referred to as a crosswise direction and a direction orthogonal to the adhesive portion 310 is referred to as a lengthwise direction.

Furthermore, referring to FIG. 16 to FIG. 20, the edit screen 210 printed by the printer 100 is referred to as "printout".

Moreover, referring to FIG. 16 to FIG. 20, "left and right" and "upward and downward" directions are determined based on the directions shown in FIG. 16 to FIG. 20.

Figure 16:
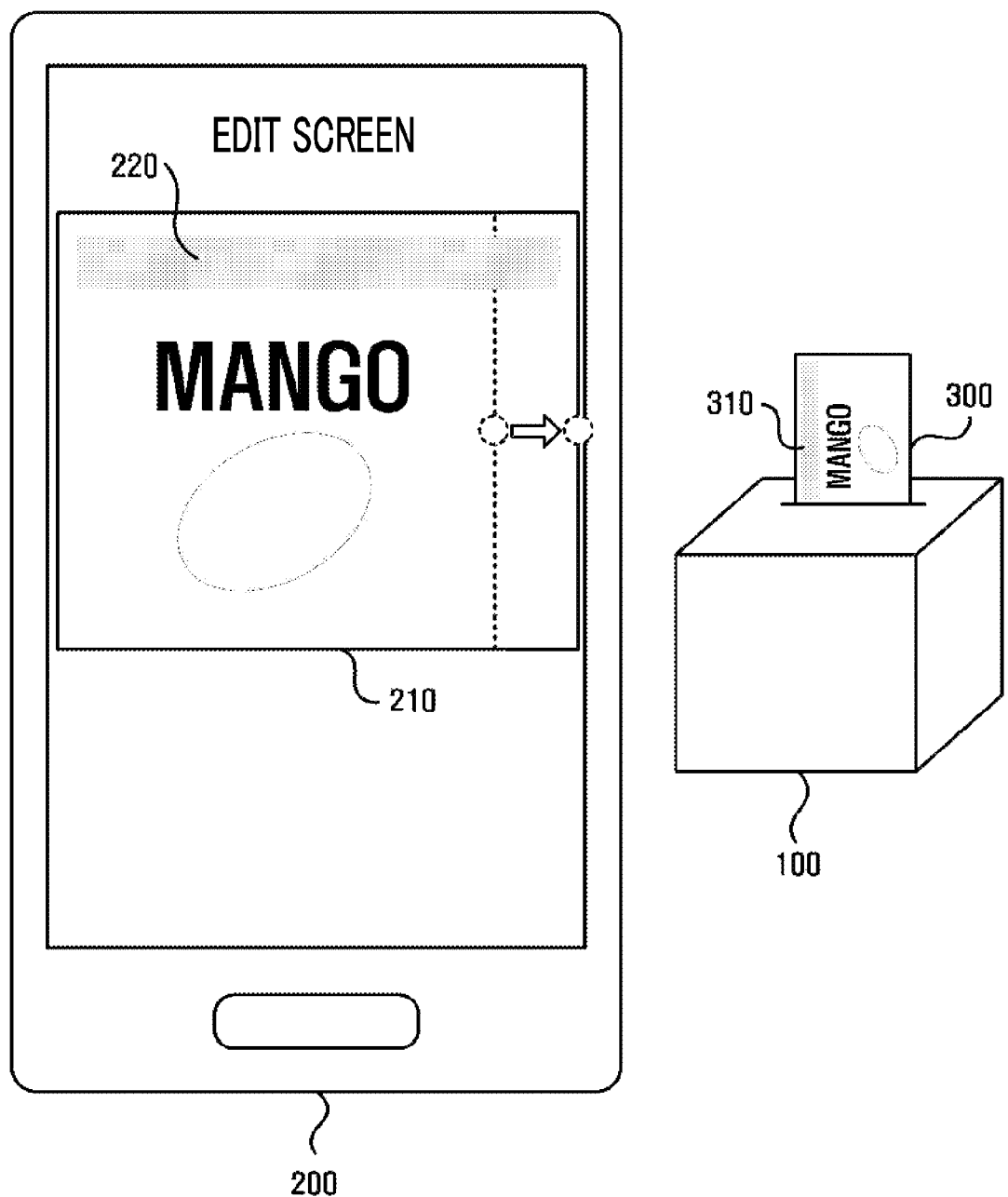
FIG. 16 to FIG. 20 are diagrams illustrating examples of changing the size of an edit area and printing a repositionable note according to a change in size of the edit area by a printer.

Referring to FIG. 16, the user client 200 may receive a drag-and-drop touch input to touch a first point on the right side of the edit screen 210 and drag to the right and then drop on a second point.

In response to the user's drag-and-drop touch input, a right edge of the edit screen 210 displayed on the user client 200 may be moved from a first edge indicated by a broken line in FIG. 16 to a second edge located on the right of the first edge and indicated by a solid line in FIG. 16.

That is, a crosswise length of the edit screen 210 displayed on the user client 200 may be increased to the right. The adhesive portion locator 220 displayed in the edit screen 210 may also be lengthened to the right.

In an embodiment, as illustrated in FIG. 16, the existing image in the edit screen 210 may be left where it is and a space made by lengthening of the edit screen 210 to the right may become a blank.

In another embodiment, the existing image in the edit screen 210 may be moved to the right together with the right edge, and, thus, a blank may be left on the left side of the edit screen 210.

Referring to FIG. 16, the printer 100 may print the repositionable note 300 according to the changed size of the edit screen 210, i.e., the changed length of the edit screen 210.

As a result of the operation illustrated in FIG. 16, the crosswise length of the edit screen 210 is increased. Therefore, the printer 100 can print the repositionable note 300 to be increased in length by as much as the increased crosswise length of the edit screen 210.

If the repositionable note 300 is printed in a predetermined length, the printer 100 may cut the repositionable note 300. In an embodiment, if printing is complete, the printer 100 may automatically cut the repositionable note 300. In another embodiment, even if printing is complete, the printer 100 may not immediately cut the repositionable note 300 but may cut the repositionable note 300 in response to the user's input.

Figure 17:
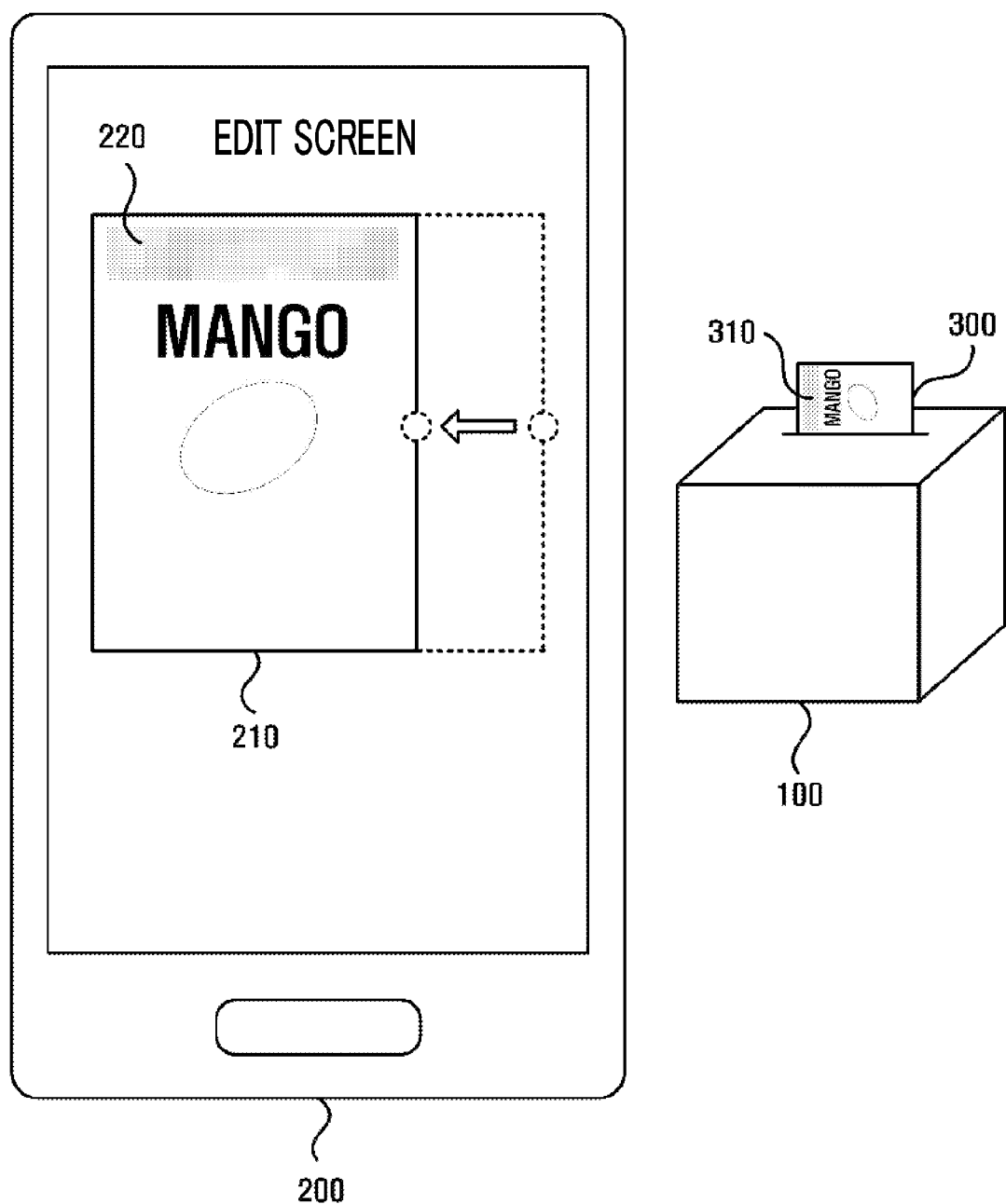

Referring to FIG. 17, the user client 200 may receive a drag-and-drop touch input to touch a first point on the right side of the edit screen 210 and drag to the left and then drop on a second point.

In response to the user's drag-and-drop touch input, the right edge of the edit screen 210 displayed on the user client 200 may be moved from a first edge indicated by a broken line in FIG. 16 to a second edge located on the left of the first edge and indicated by a solid line in FIG. 16.

That is, the crosswise length of the edit screen 210 displayed on the user client 200 may be decreased to the left. The adhesive portion locator 220 displayed in the edit screen 210 may also be shortened to the left.

In an embodiment, the existing image displayed in the edit screen 210 may be reduced in proportion as the edit screen 210 is shortened.

In another embodiment, the existing image displayed in the edit screen 210 may be displayed in the same size regardless of a decrease in crosswise length of the edit screen 210. In this case, a part of the image may be cut out. Otherwise, only when the image has a length greater than the changed length of the edit screen 210 and thus can be cut out, the image may be reduced to be displayed in the shortened edit screen 210.

Referring to FIG. 17, the printer 100 may print the repositionable note 300 according to the changed size of the edit screen 210, i.e., the changed length of the edit screen 210.

As a result of the operation illustrated in FIG. 17, the crosswise length of the edit screen 210 is decreased. Therefore, the printer 100 can print the repositionable note 300 to be decreased in length by as much as the decreased crosswise length of the edit screen 210.

Figure 18:
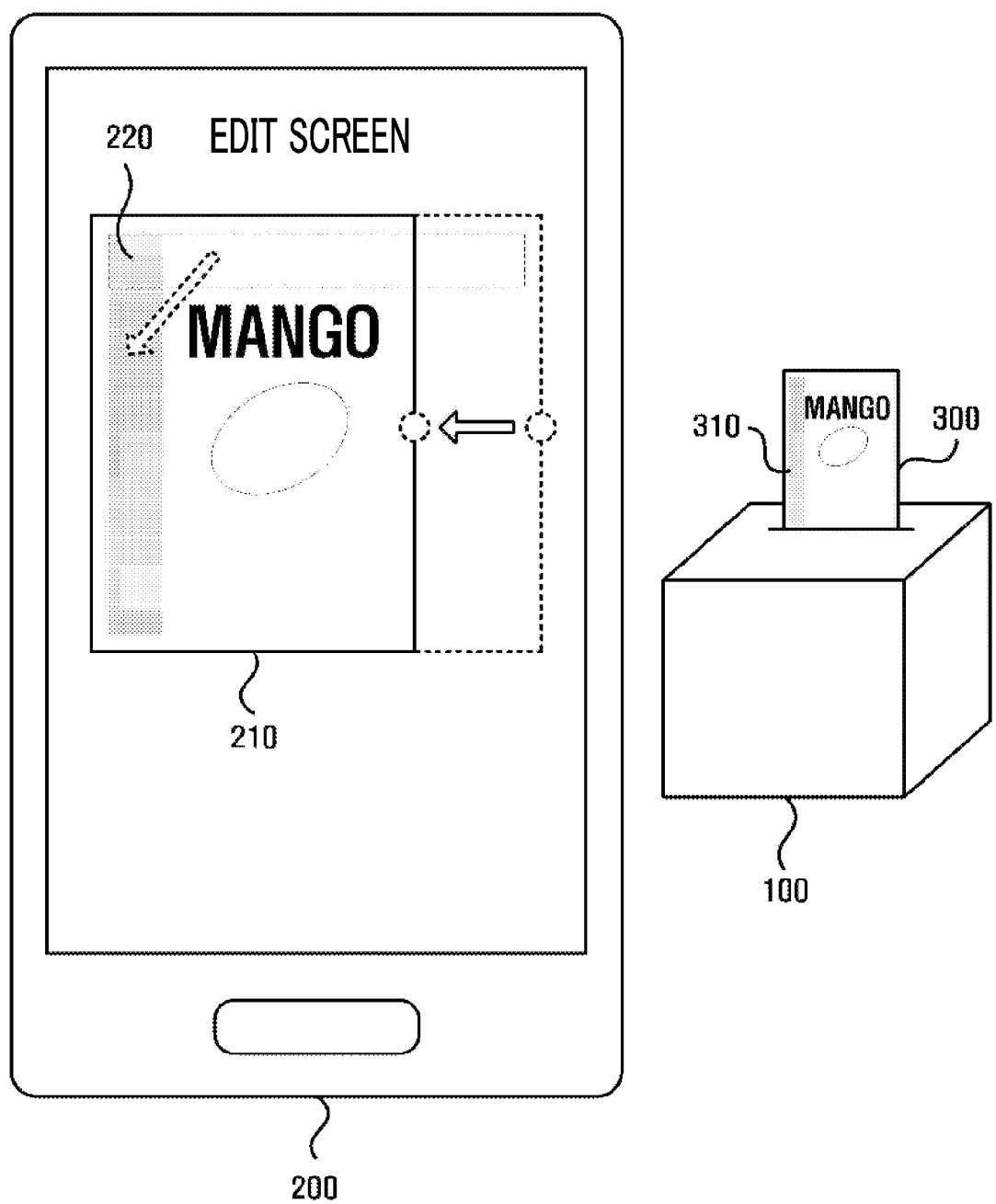

Referring to FIG. 18, the user client 200 may receive a drag-and-drop touch input to touch a first point on the right side of the edit screen 210 and drag to the left and then drop on a second point.

In response to the user's drag-and-drop touch input, the right edge of the edit screen 210 displayed on the user client 200 may be moved from a first edge indicated by a broken line in FIG. 16 to a second edge located on the left of the first edge and indicated by a solid line in FIG. 16.

That is, a crosswise length of the edit screen 210 displayed on the user client 200 may be decreased to the left. The adhesive portion locator 220 displayed in the edit screen 210 may also be shortened to the left.

Referring to FIG. 18, a location of the adhesive portion locator 220 may be changed unlike the illustration in FIG. 17.

In an embodiment, as the crosswise length of the edit screen 210 is decreased, the location of the adhesive portion locator 220 may be changed to the left side. Whether or not to change the location of the adhesive portion locator 220 may be determined by the user's selection.

In this case, the existing image displayed in the edit screen 210 may be reduced in proportion as the crosswise length of the edit screen 210 displayed on the user client 200 is decreased. However, a lengthwise length of the repositionable note 300 cannot be changed, and, thus, a crosswise length of a printout actually printed by the printer 100 is not changed and a print size of the image displayed in the edit screen 210 is not changed.

Referring to FIG. 18, the printer 100 may print the repositionable note 300 according to the changed size of the edit screen 210, i.e., the changed length of the edit screen 210.

Although the crosswise length of the edit screen 210 displayed on the user client 200 is decreased, the adhesive portion locator 220 displayed in the edit screen 210 is moved to the left, and, thus, a lengthwise length of the edit screen 210 displayed on the user client 200 is decreased. However, since a lengthwise length of the repositionable note 300 is fixed, the crosswise length of the edit screen 210 displayed relatively long in the screen of the user client 200 can be considered as increased.

Therefore, the printer 100 can print the repositionable note 300 to be increased in length by as much as the increased crosswise length of the edit screen 210.

Figure 19:
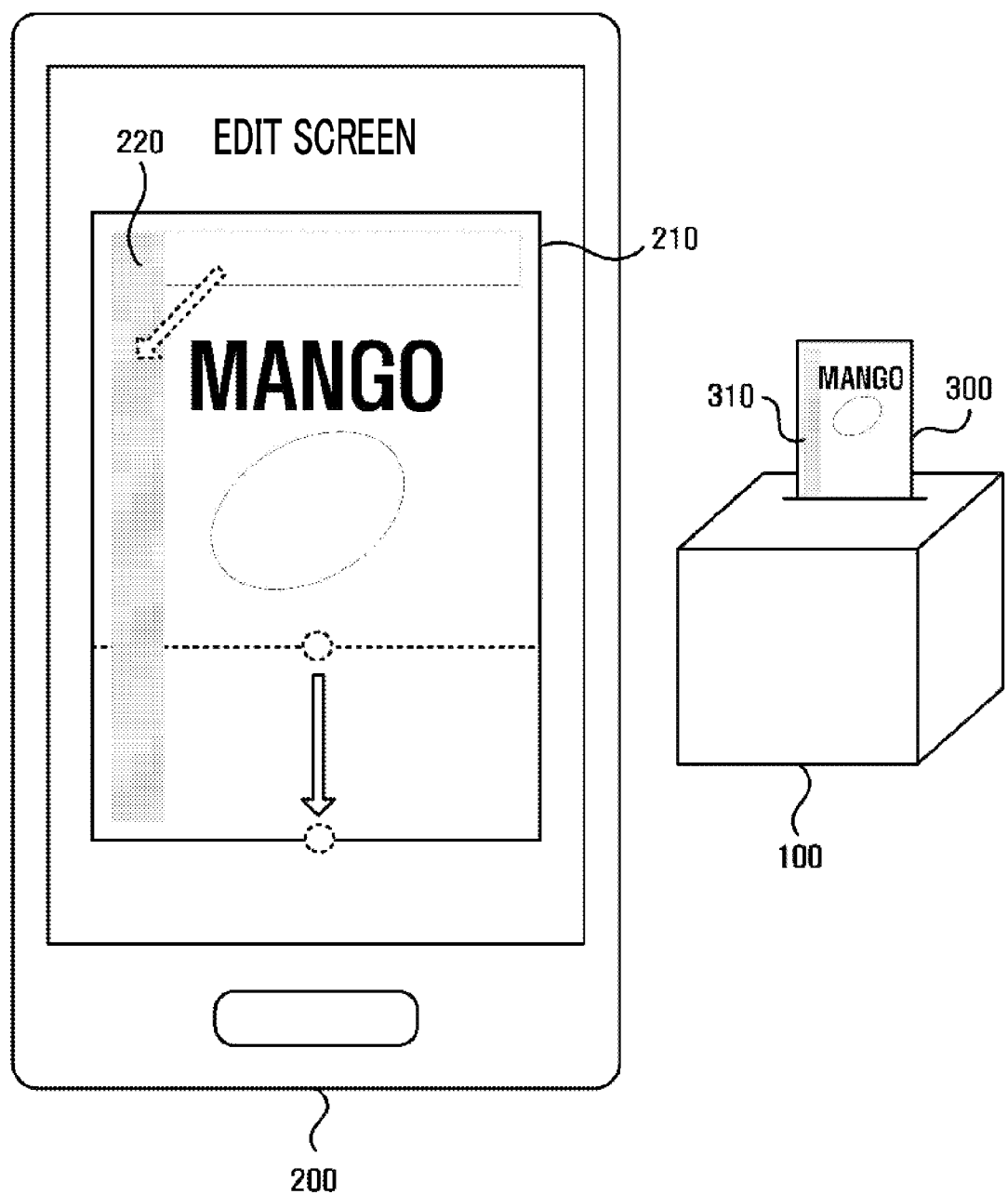

Referring to FIG. 19, the user client 200 may receive a drag-and-drop touch input to touch a first point on the lower side of the edit screen 210 and drag down and then drop on a second point.

In response to the user's drag-and-drop touch input, a lower edge of the edit screen 210 displayed on the user client 200 may be moved from a first edge indicated by a broken line in FIG. 19 to a second edge located on the lower side of the first edge and indicated by a solid line in FIG. 19.

That is, the lengthwise length of the edit screen 210 displayed on the user client 200 may be increased to a downward direction.

In an embodiment, the adhesive portion locator 220 may be located as it is on the upper side of the edit screen 210. However, the repositionable note is configured in the form of a roll and thus can be printed to be long crosswise but cannot be changed in lengthwise length.

Therefore, if the adhesive portion locator 220 is located as it is on the upper side of the edit screen 210, the edit screen 210 displayed on the user client 200 is increased in size but an actual printout is decreased only in crosswise length as shown in FIG. 17.

Further, as shown in an embodiment illustrated in FIG. 19, a location of the adhesive portion locator 220 may be changed to the left side.

In the same manner as described above with reference to FIG. 18, whether or not to change the location of the adhesive portion locator 220 may be determined by the user's selection.

In this case, as the lengthwise length of the edit screen 210 is increased, the crosswise length of the edit screen 210 is increased.

In an embodiment, as illustrated in FIG. 19, the existing image in the edit screen 210 may be left where it is and a space made by downward lengthening of the edit screen 210 displayed on the user client 200 may become a blank.

In another embodiment, the existing image in the edit screen 210 may be moved to the downward direction together with the lower edge, and, thus, a blank may be left on the upper side of the edit screen 210.

Referring to FIG. 19, the printer 100 may print the repositionable note 300 according to the changed size of the edit screen 210, i.e., the changed length of the edit screen 210.

Therefore, the printer 100 can print the repositionable note 300 to be increased in length by as much as the increased crosswise length of the edit screen 210.

Figure 20:
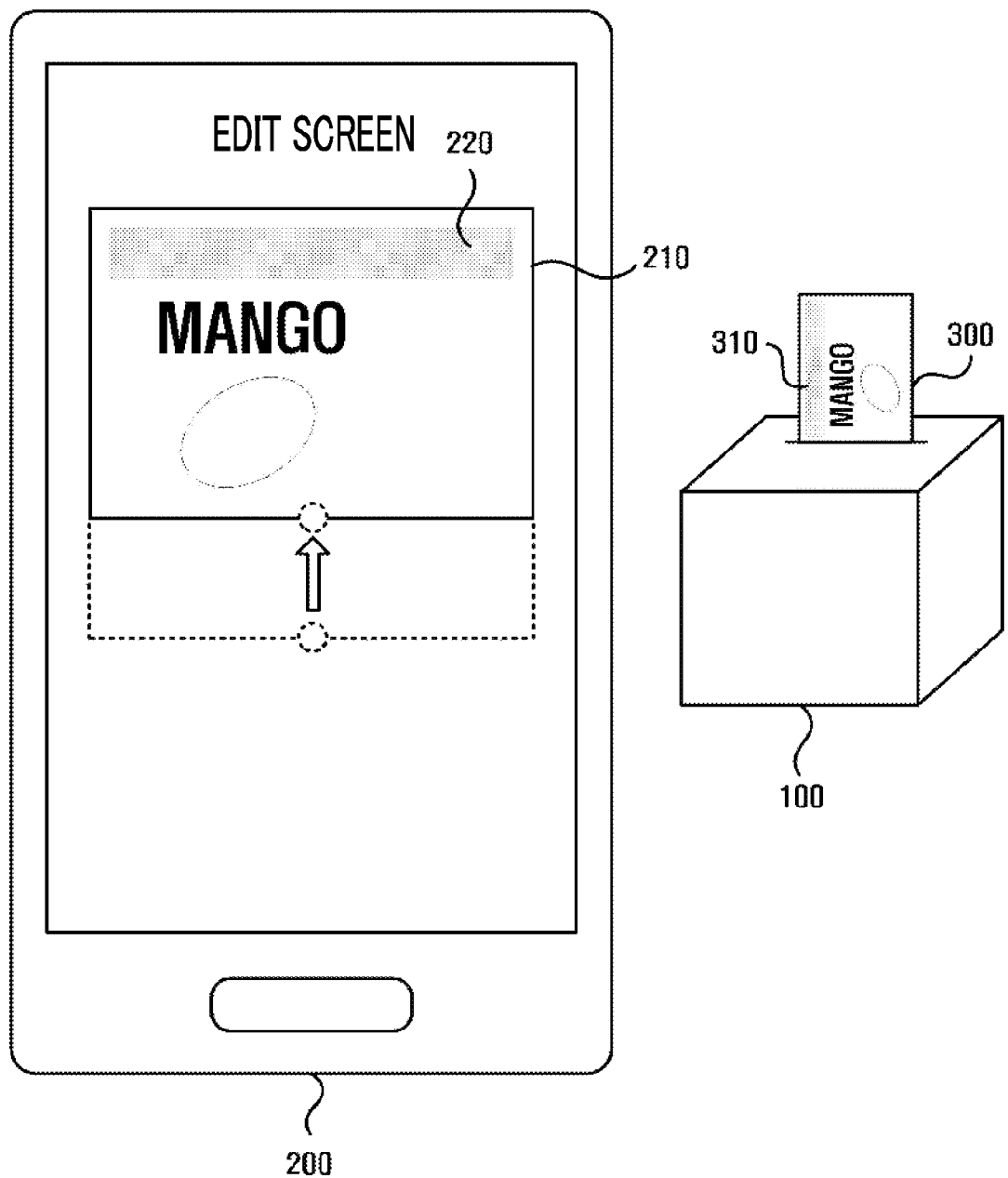

Referring to FIG. 20, the user client 200 may receive a drag-and-drop touch input to touch a first point on the lower side of the edit screen 210 and drag up and then drop on a second point.

In response to the user's drag-and-drop touch input, the lower edge of the edit screen 210 displayed on the user client 200 may be moved from a first edge indicated by a broken line in FIG. 19 to a second edge located on the upper side of the first edge and indicated by a solid line in FIG. 19.

That is, the lengthwise length of the edit screen 210 displayed on the user client 200 may be decreased to an upward direction.

In an embodiment, as the lengthwise length of the edit screen 210 displayed on the user client 200 is decreased, the image displayed in the edit screen 210 may also be reduced in proportion as the lengthwise length of the edit screen 210 displayed on the user client 200 is decreased. However, the lengthwise length of the actually printed edit screen 210 cannot be changed, and, thus, a print size of the image displayed in the edit screen 210 is not changed.

As illustrated in FIG. 20, the lengthwise length of the edit screen 210 displayed on the user client 200 is decreased, but the lengthwise length of the repositionable note 300 actually printed by the printer 100 is not decreased.

Therefore, the crosswise length of the edit screen 210 displayed on the user client 200 is relatively increased. Accordingly, a length of a printout printed by the printer 100 is also increased.

As illustrated in the edit screen 210 in FIG. 20, as the crosswise length of the edit screen 210 becomes greater than the lengthwise length of the edit screen 210, a blank may be left on the right side of the edit screen 210. In another embodiment, the image displayed in the edit screen 210 may be moved to the right and a blank may be left on the left side of the edit screen 210.

In an embodiment, the adhesive portion locator 220 may be displayed on the left side of the edit screen 210 in response to the user's touch input on the adhesive portion locator 220 displayed in the edit screen 210.

In this case, as illustrated in FIG. 17, the crosswise length of the edit screen 210 may be decreased. Therefore, a length of a printout printed by the printer 100 is also decreased. A crosswise length of an image or printout printed by the printer 100 may be decreased in proportion as the crosswise length of the edit screen 210 is decreased.

In the embodiments illustrated in FIG. 16 to FIG. 20, a magnification of the edit screen 210 displayed on the user client 200 may be fixed or automatically adjusted.

For example, it is possible to set a mode in which the magnification of the edit screen 210 displayed on the user client 200 is fixed or automatically adjusted.

For example, if the magnification of the edit screen 210 is set to be fixed, when the crosswise length of the edit screen 210 is decreased, a crosswise length of an actual printout is also decreased as shown in FIG. 17. In this case, a size of an actually printed image may be decreased.

If the magnification of the edit screen 210 is set to be automatically adjusted, the location of the adhesive portion may be changed and a crosswise length of an actual printout is increased as shown in FIG. 18. In this case, a size of an actually printed image is not changed.

Figure 21:
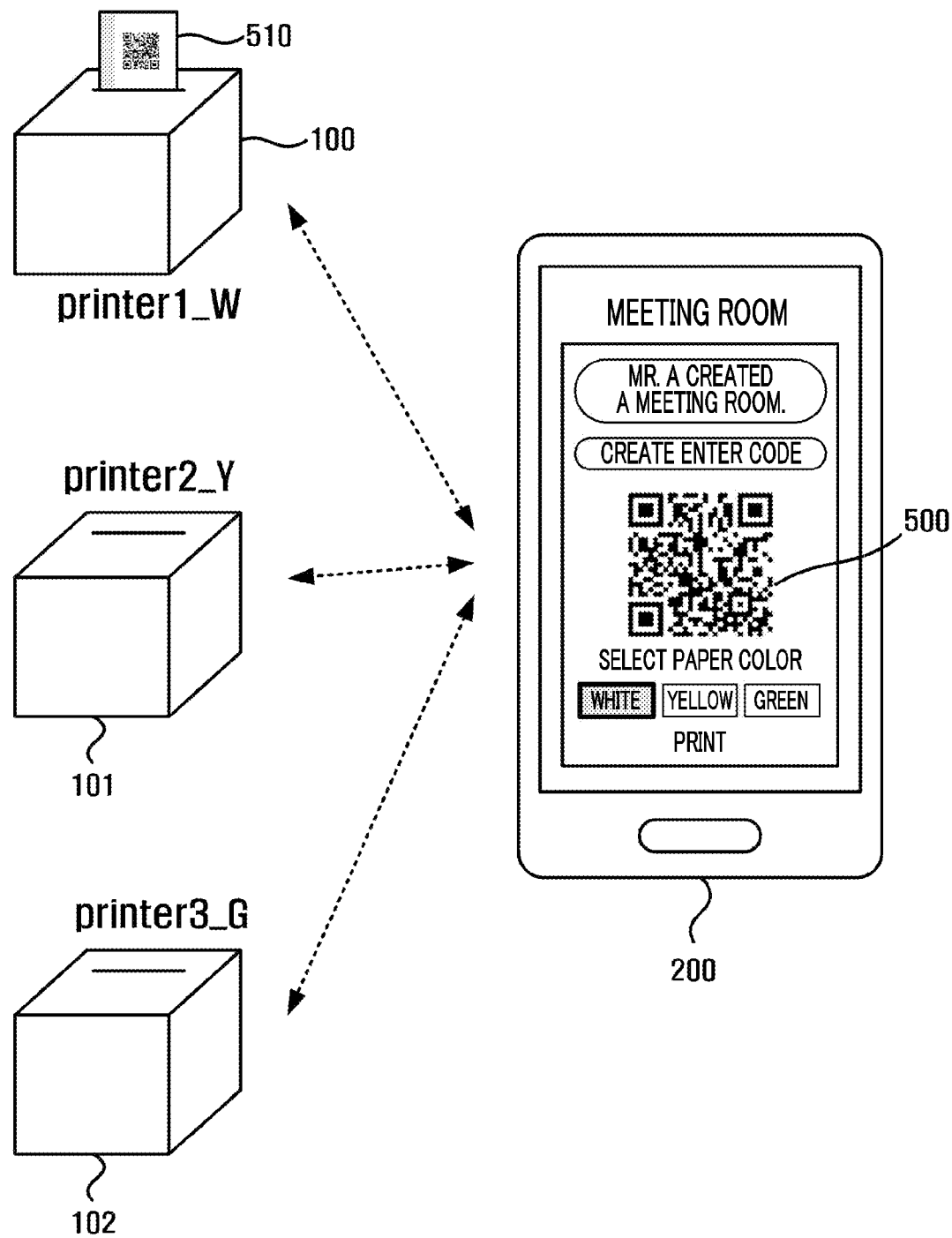
FIG. 21 is a diagram showing a method for creating a chat room using a printer according to an embodiment of the present disclosure.

FIG. 21 is a diagram showing a method for creating a chat room using a printer according to an embodiment of the present disclosure.

Referring to FIG. 21, the user client 200 may be linked to one or more printers.

The user client 200 may create a chat room. In the present disclosure, the chat room refers to a messenger service that enables one or more user clients to perform chat and data upload via a network.

In an embodiment, the user client 200 may make a request for creating a chat room to a server. The server may create a chat room in response to the request of the user client 200.

In the present disclosure, a user client 200 that creates a chat room is referred to as a chief client. Further, one or more other user clients that participate in the chat room are referred to as participant clients.

When the chat room is created, the chief client 200 may create a two-dimensional code 500 including information to participate in the chat room and print the two-dimensional code 500 through the printer 100. That is, the chief client 200 may transmit the created two-dimensional code 500 to the printer 100 to be printed.

In an embodiment, the chief client 200 may make a request for creating the two-dimensional code 500 including the information to participate in the chat room to the server. The server may create the two-dimensional code 500 including the information to participate in the chat room and transmit the created two-dimensional code 500 to the chief client 200.

In an embodiment, the two-dimensional code 500 may include link information to access the chat room and authentication information to use the chat room. For example, the two-dimensional code 500 may include a URL to access the chat room and a password to use the chat room.

In an embodiment, the two-dimensional code 500 may include information about time when the two-dimensional code 500 is created. If a participant client photographs the two-dimensional code 500 to use the chat room, the server or the chief client 200 may obtain information about time when the two-dimensional code 500 is created, included in the two-dimensional code 500 photographed by the participant client.

After a predetermined period of time from the time when the two-dimensional code 500 is created, the server or the user client 200 may not allow the participant client to enter the chat room. That is, the server or the user client 200 may allow only a participant client that photographs the two-dimensional code 500 within a predetermined period of time after the two-dimensional code 500 is created and printed to enter the chat room.

In an embodiment, the two-dimensional code 500 may be set to be printed only by a specific printer 100 that prints the repositionable note 300.

For example, the specific printer 100 that prints the repositionable note 300 may store a secret key to be used for encryption and decryption.

Further, a public key may be distributed to one or more user clients 200 using the printer 100.

The user client 200 may use the public key to encrypt a two-dimensional code and transmit the two-dimensional code, and the printer 100 may use the secret key to decrypt the two-dimensional code and the print the two-dimensional code.

The two-dimensional code 500 can be encrypted and decrypted by using various other encryption and decryption methods in addition to the use of the public key and the secrete key.

In another embodiment, authentication may be performed to the printer 100 instead of encryption of the two-dimensional code 500, and the two-dimensional code 500 may be set to be printed only by the authenticated printer 100.

Figure 22:
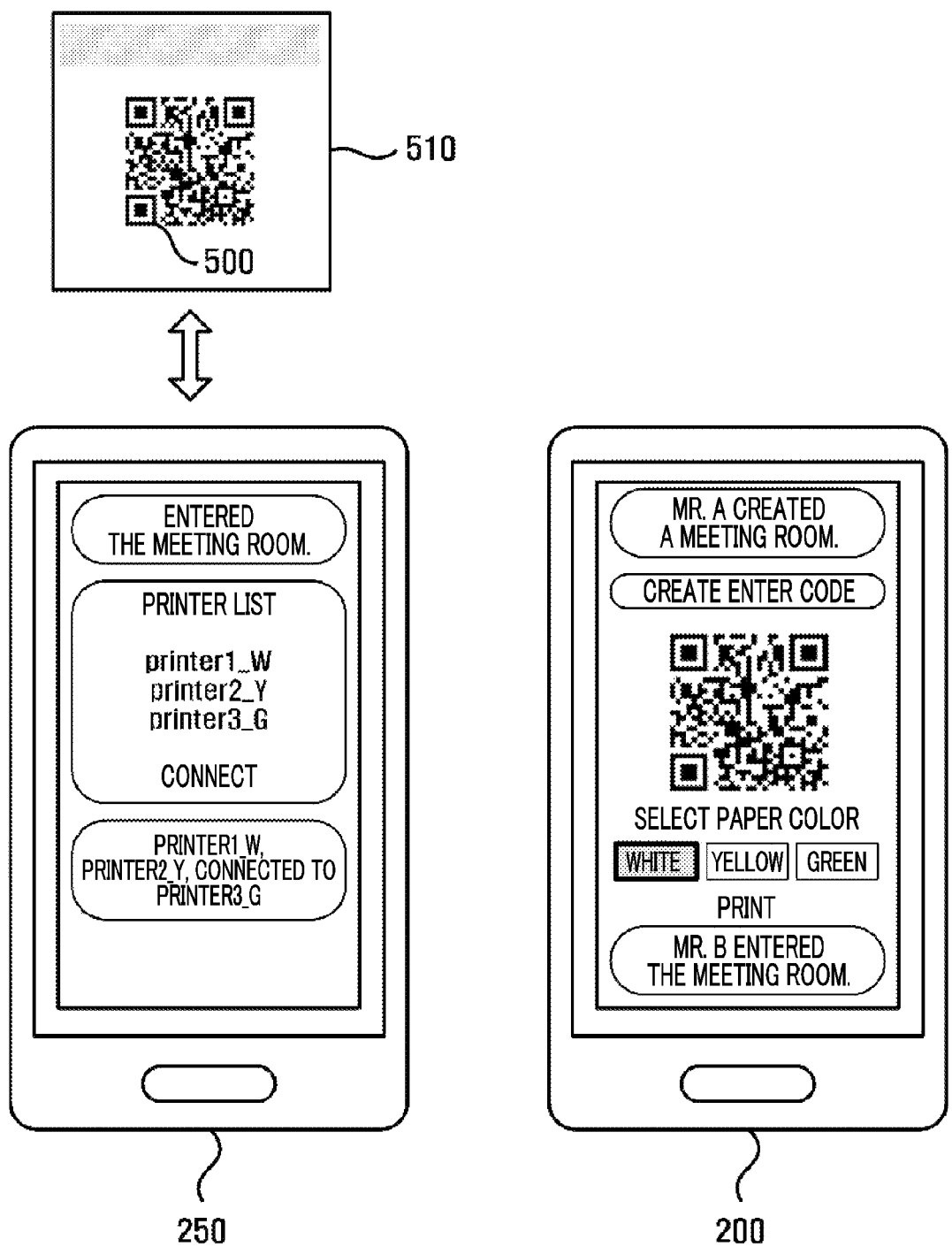
FIG. 22 is a diagram showing an example of a method in which a participant client participates in a chat room.

FIG. 22 is a diagram showing an example of a method in which a participant client participates in a chat room.

Referring to FIG. 22, a participant client 250 may photograph a repositionable note 510 in which the two-dimensional code 500 is printed. The participant client 250 may obtain link information to access the chat room and authentication information to use the chat room from the photographed two-dimensional code 500.

The participant client 250 may use the obtained link information to access the chat room and transmit the obtained authentication information to make a request for approval to enter the chat room. When the participant client 250 receives approval information from the server or the chief client 200, the participant client 250 may participate in the chat room.

In an embodiment, the server or the chief client 200 may determine the validity of the authentication information received from the participant client 250. If the server or the chief client 200 determines that the authentication information received from the participant client 250 is valid, the server or the chief client 200 may perform authentication to the participant client 250 based on the received authentication information to determine whether or not to approve entrance into the chat room.

For example, the authentication information may include information about time when the two-dimensional code 500 is created. If the server or the chief client 200 receives the authentication information within a predetermined period of time after the two-dimensional code 500 is created which is included in the authentication information received from the participant client 250, the server or the chief client 200 may determine that the authentication information is valid.

The chief client 200 may transmit information about the one or more printers linked to the chief client 200 to the server.

The participant client 250 may receive the information about the one or more printers linked to the chief client 200 from the server. For example, the participant client 250 may receive information to perform pairing with the one or more printers linked to the chief client 200.

The information to perform pairing with the printers may include Bluetooth search names of the one or more printers linked to the chief client 200 or passwords to perform pairing.

The participant client 250 may use the received information to perform pairing with the one or more printers linked to the chief client 200.

For example, the participant client 250 may perform Bluetooth search, select one or more printers corresponding to the Bluetooth search names included in the received information, and transmit passwords corresponding to the respective one or more printers to perform pairing with the one or more printers.

Figure 23:
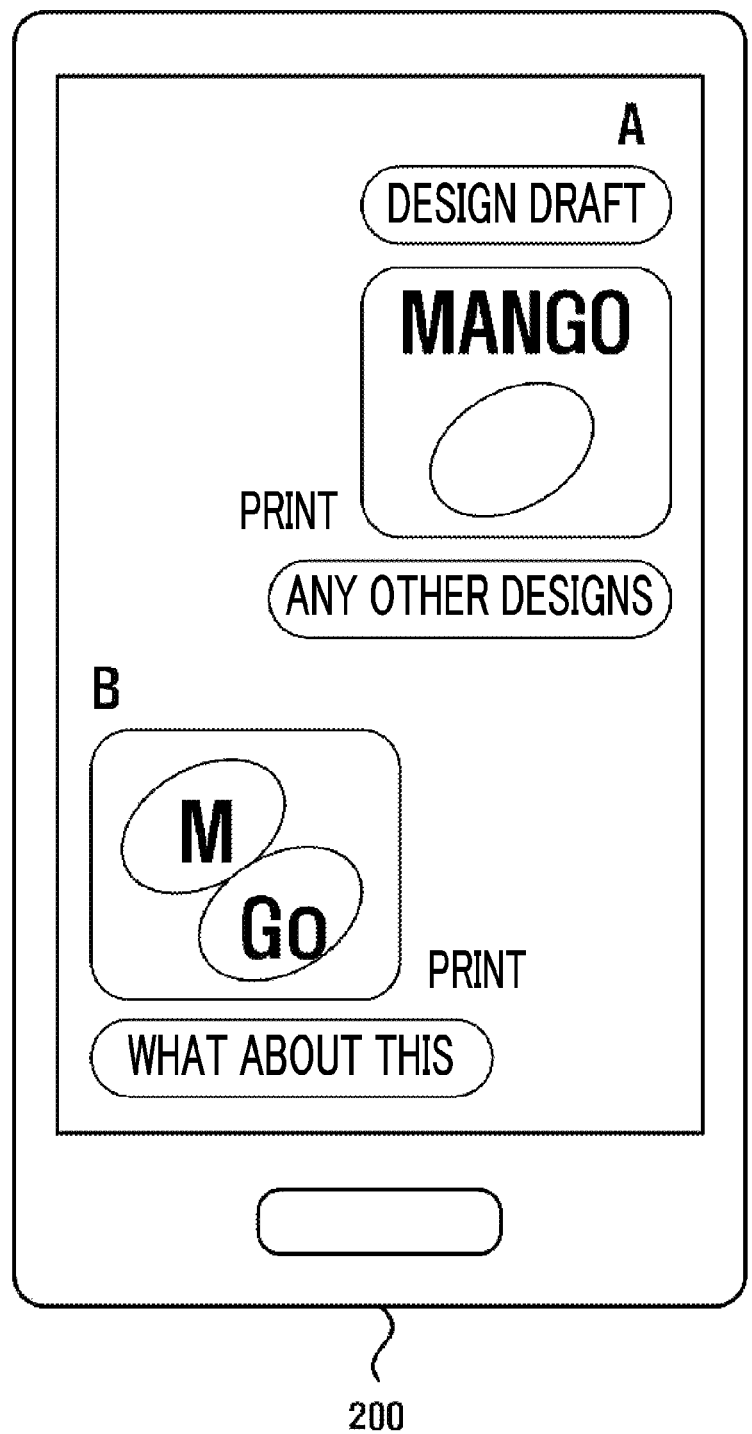
FIG. 23 is a diagram showing a method of using a chat room according to an embodiment of the present disclosure.

FIG. 23 is a diagram showing a method of using a chat room according to an embodiment of the present disclosure.

In an embodiment illustrated in FIG. 23, a user of the user client 200 and a user of the participant client 250 may be displayed as A and B, respectively, in a chat room.

As illustrated in FIG. 23, the chat room may be used to exchange messages including texts and images between the users. The texts and images uploaded to the chat room may be printed by using the printer 100.

For example, the user client 200 may receive an input to select an image or text uploaded to the chat room and displayed in the screen of the user client 200. The user client 200 may transmit the selected image or text to the printer 100 to be printed.

In an embodiment, the image or text uploaded to the chat room and displayed in the screen of the user client 200 may be displayed together with a print button to transmit and print the image or text to the printer 100. If the user client 200 receives an input to select the print button displayed in the screen of the user client 200, the user client 200 may transmit an image or text corresponding to the selected print button to the printer 100 to be printed.

In an embodiment, a text or image uploaded to the chat room may be transmitted to the printer 100 to be printed simultaneously with being uploaded to the chat room. Therefore, the user may use the user client 200 to enable the text or image to be printed by the printer 100 simultaneously with being uploaded to the chat room.

In an embodiment, the text or image uploaded to the chat room may be set to be printed only by a specific printer 100 that prints the repositionable note 300.

Figure 24:
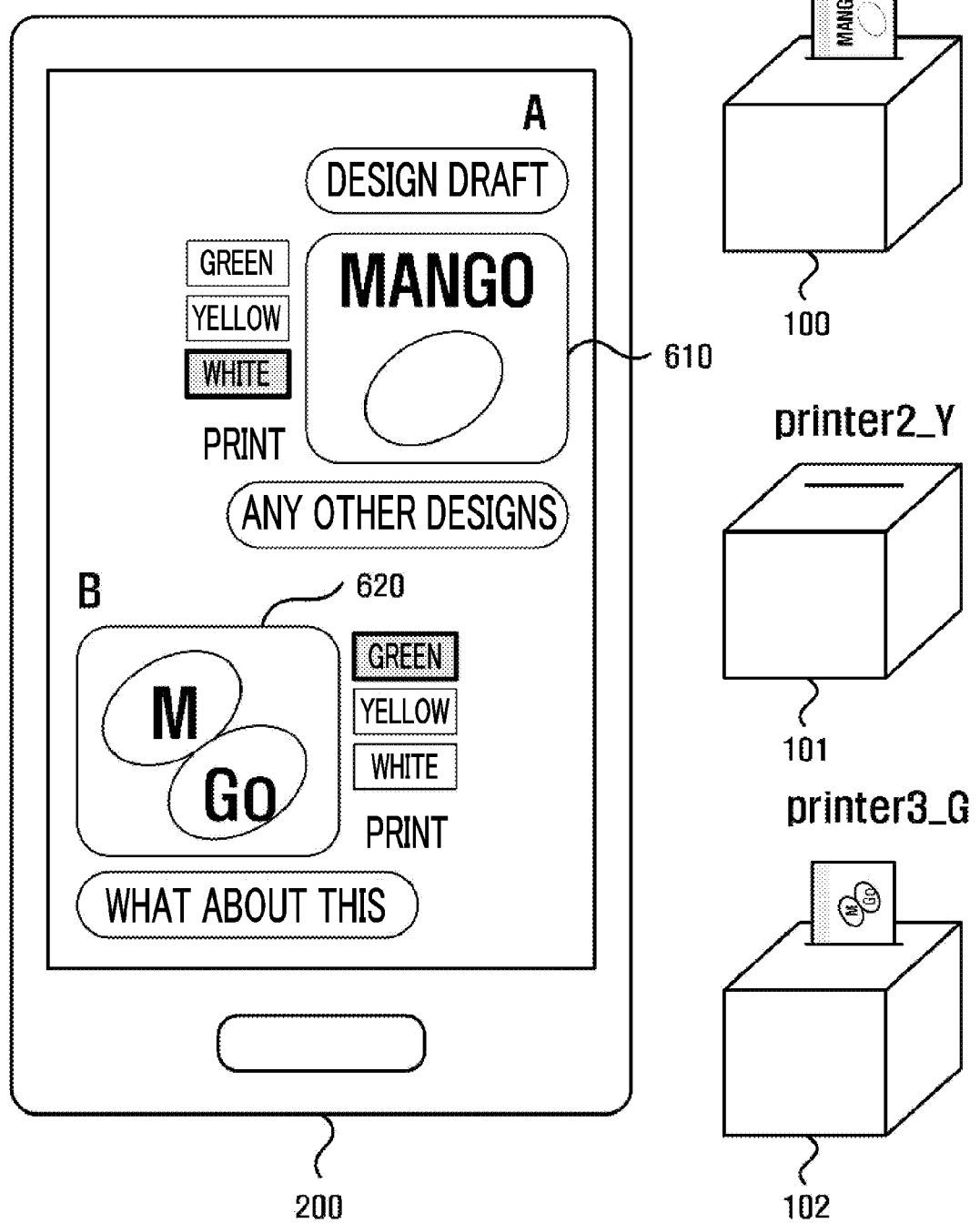
FIG. 24 is a diagram showing an example of printing a text or image uploaded to a chat room.

FIG. 24 is a diagram showing an example of printing a text or image uploaded to a chat room.

In an embodiment, the user client 200 may be linked to one or more printers 100, 101, and 102. If the user client 200 receives an input to select a print button displayed in the screen of the user client 200, the user client 200 may display a list of printable colors. Referring to FIG. 24, the user client 200 is linked to printers that can print white, yellow, and green repositionable notes, respectively.

Therefore, if the user wants to print a text or image uploaded to a chat room, the user client 200 may display a screen to select one of white, yellow, and green.

If the user selects a color, the user client 200 may transmit an edit screen to a printer corresponding to the selected color the linked printer to be printed.

Referring to FIG. 24, the user client 200 may receive an input to select and print a first image 610 uploaded to the chat room and displayed in the screen of the user client 200 and an input to select white. Therefore, the user client 200 may transmit information about the first image 610 to the printer 100 that prints a white repositionable note to be printed.

Further, the user client 200 may receive an input to select and print a second image 620 uploaded to the chat room and displayed in the screen of the user client 200 and an input to select green. Therefore, the user client 200 may transmit information about the second image 620 to the printer 102 that prints a green repositionable note to be printed.

Figure 25:
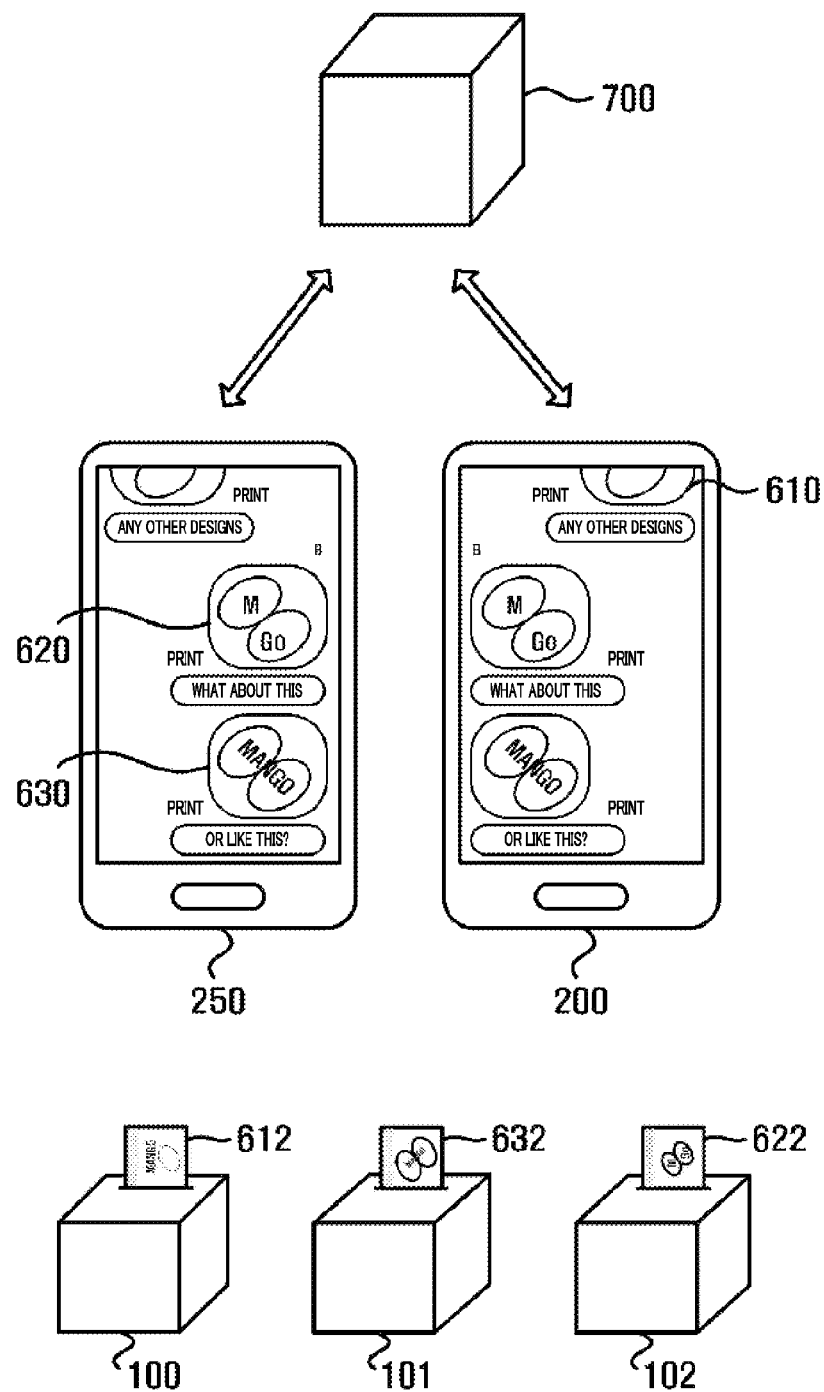
FIG. 25 is a diagram showing an example where a chief client and a participant client use a chat room.

FIG. 25 illustrates an example where the user client 200 as a chief client and the user client 250 as a participant client use a chat room.

In an embodiment, a chat room may be displayed in a screen of the user client 200 and a screen of the user client 250. The chat room displayed in the respective screens of the user client 200 and the user client 250 may display the first image 610 uploaded by the user client 200 and the second image 620 and a third image 630 uploaded by the user client 250.

In an embodiment, the chat room may be managed by a server 700. The server 700 receives the first image 610, the second image 620, and the third image 630 uploaded by the user client 200 and the user client 250 and one or more text messages.

The server 700 transfers one or more text messages and one or more images received from the user client 200 to the user client 250 and transfers one or more text messages and one or more images received from the user client 250 to the user client 200.

Further, the server 700 may store one or more text messages and one or more images received from the user client 200 and the user client 250 in a storage space corresponding to the chat room used by the user client 200 and the user client 250.

In an embodiment, the user client 200 or the user client 250 may receive an input to select and print at least one of the first image 610, the second image 620, and the third image 630.

The user client 200 or the user client 250 may transmit information about the at least one of the first image 610, the second image 620, and the third image 630 to the printer 100, 101, or 102 to be printed in response to the received input.

FIG. 26 is a diagram showing an example of conducting a meeting by using a repositionable note printed through a printer.

In an embodiment using a printer for printing a repositionable note, a meeting can be conducted using one or more repositionable notes 612 to 632 printed through the one or more printers 100 to 102.

For example, while the meeting is conducted, the printed one or more repositionable notes 612 to 632 can be attached to a whiteboard and some notes can be written on the whiteboard.

The one or more repositionable notes 612 to 632 illustrated in FIG. 26 may be printouts of the one or more images 610 to 630, respectively, uploaded to the chat room illustrated in FIG. 25.

Figure 27:
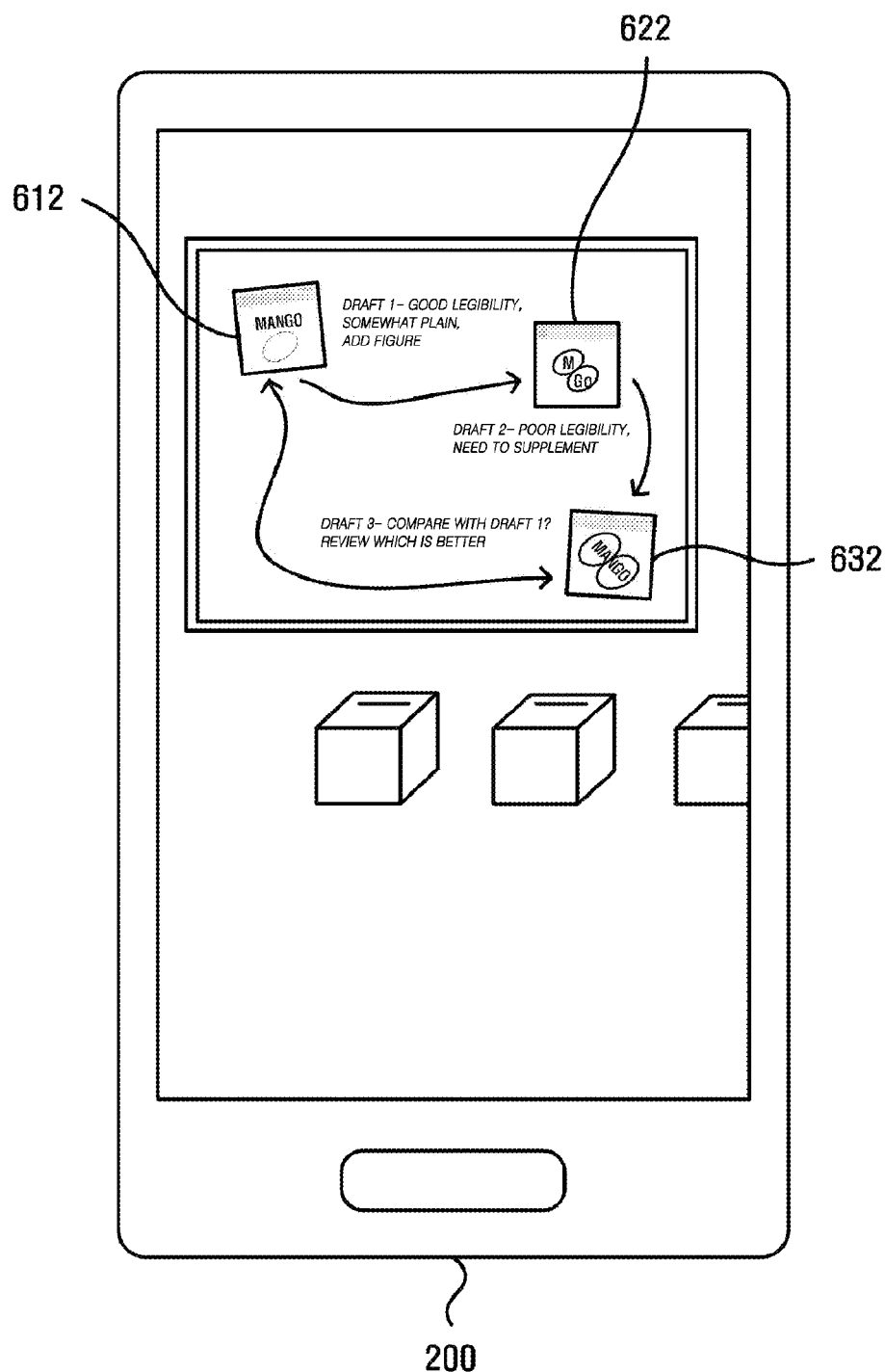
FIG. 27 is a diagram showing an example of taking a photo of the result of the meeting shown in FIG. 26 by using a user client.

FIG. 27 illustrates an example of taking a photo of the result of the meeting shown in FIG. 26 by using the user client 200.

In an embodiment, the user client 200 photographs a region including the printed one or more repositionable notes 612, 622, and 632. The user client 200 may obtain an image of the region including the printed one or more repositionable notes 612, 622, and 632 and recognize at least a part of the region, such as the one or more repositionable notes 612, 622, and 632, included in the obtained image.

The user client 200 may match images included in the recognized one or more repositionable notes 612, 622, and 632 with one or more images stored in the server 700.

In an embodiment, the user client 200 may search images matched with the images included in the repositionable notes 612, 622, and 632 from among images uploaded from the chat room linked to the user client 200 and stored in the server 700.

Further, the server 700 may allow the user client 200 to access only images stored in the storage space corresponding to the chat room where the user client 200 belongs.

Therefore, only a user client that conducts a meeting using the chat room illustrated in FIG. 22 to FIG. 25 can obtain matched images when photographing the repositionable notes illustrated in FIG. 26.

For example, the user client 200 may match an image included in the repositionable note 612 with the first image 610 stored in the server 700. Likewise, the user client may match an image included in the repositionable note 622 with the second image 620 stored in the server 700 and an image included in the repositionable note 632 with the third image 630 stored in the server 700.

In an embodiment, any method or algorithm capable of analyzing image similarity may be used to match an image included in a repositionable note with an image stored in the server.

The user client 200 may determine the similarity between an image included in a repositionable note and the images stored in the server 700 and select an image with the highest similarity from among one or more images with a higher similarity to the image included in the repositionable note than a predetermined reference value. The user client 200 may match the selected image with the image included in the repositionable note.

In an embodiment, the user client 200 may transmit the image included in the repositionable note to the server 700.

The server 700 may determine the similarity between the images stored in the server 700 and the image received from the user client 200 and select an image with the highest similarity from among one or more images with a higher similarity to the received image than a predetermined reference value. The server 700 may transmit the selected image to the user client 200.

In the embodiments disclosed herein, each of the user client 200 or the server 700 can perform a part or all of the method of determining the similarity between an image included in a repositionable note recognized from a photographed image and images stored in a server and matching the images.

The user client 200 may download the first image 610, the second image 620, and the third image 630 corresponding to the images included in the recognized repositionable notes 612, 622, and 632, respectively.

The user client 200 may substitute and display the matched first, second, and third images 610, 620, and 630 for the respective images included in the repositionable notes 612, 622, and 632 recognized from the photographed image.

The images shown in the repositionable notes 612, 622, and 623 may slightly deteriorate in image quality during printing. Further, the images included in the repositionable notes 612, 622, and 623 may deteriorate again in image quality while the printed repositionable note 612, 622, and 623 are photographed to obtain a photographed image.

According to the embodiments disclosed herein, a file (or original file) of the first image 610, the second image 620, and the third image 630 corresponding to the images included in the repositionable notes 612, 622, and 632 recognized from the photographed image is downloaded and the downloaded images are substituted for the images displayed in the photographed image, and, thus, it is possible to display clear images without deterioration in image quality.

The user client 200 may display the first image 610 corresponding to the image included in the repositionable note 612 in a region where the repositionable note 612 is recognized. In an embodiment, the user client 200 may convert the first image 610 to the size of the region where repositionable note 612 is recognized and then display the converted first image 610 in the screen of the user client 200.

For example, the user client 200 may convert the first image 610 according to the size and direction of the image included in the repositionable note 612 and then display the converted first image 610.

Likewise, the user client 200 may display the first image 620 corresponding to the image included in the repositionable note 622 in a region where the repositionable note 622 is recognized and the third image 630 corresponding to the image included in the repositionable note 632 in a region where the repositionable note 632 is recognized.

In an embodiment, the user client 200 may receive an input to enlarge or reduce a photograph screen displayed in the screen. If the photograph screen displayed in the screen of the user client 200 is enlarged or reduced, the repositionable notes 612, 622, and 632 displayed in the screen of the user client 200 are also enlarged or reduced in size.

Therefore, the first image 610, the second image 620, and the third image 630 displayed in the respective regions of the screen of the user client 200 where the repositionable notes 612, 622, and 632 are recognized are also enlarged or reduced in size.

In the photograph screen displayed in the screen of the user client 200, the first image 610, the second image 620, and the third image 630 are displayed instead of the photographed image in the respective regions where the repositionable notes 612, 622, and 632 are recognized. Therefore, even if the photograph screen displayed in the screen of the user client 200 is enlarged or reduced, the images in the respective regions where the repositionable notes 612, 622, and 632 are recognized can be displayed clearly.

Figure 28:
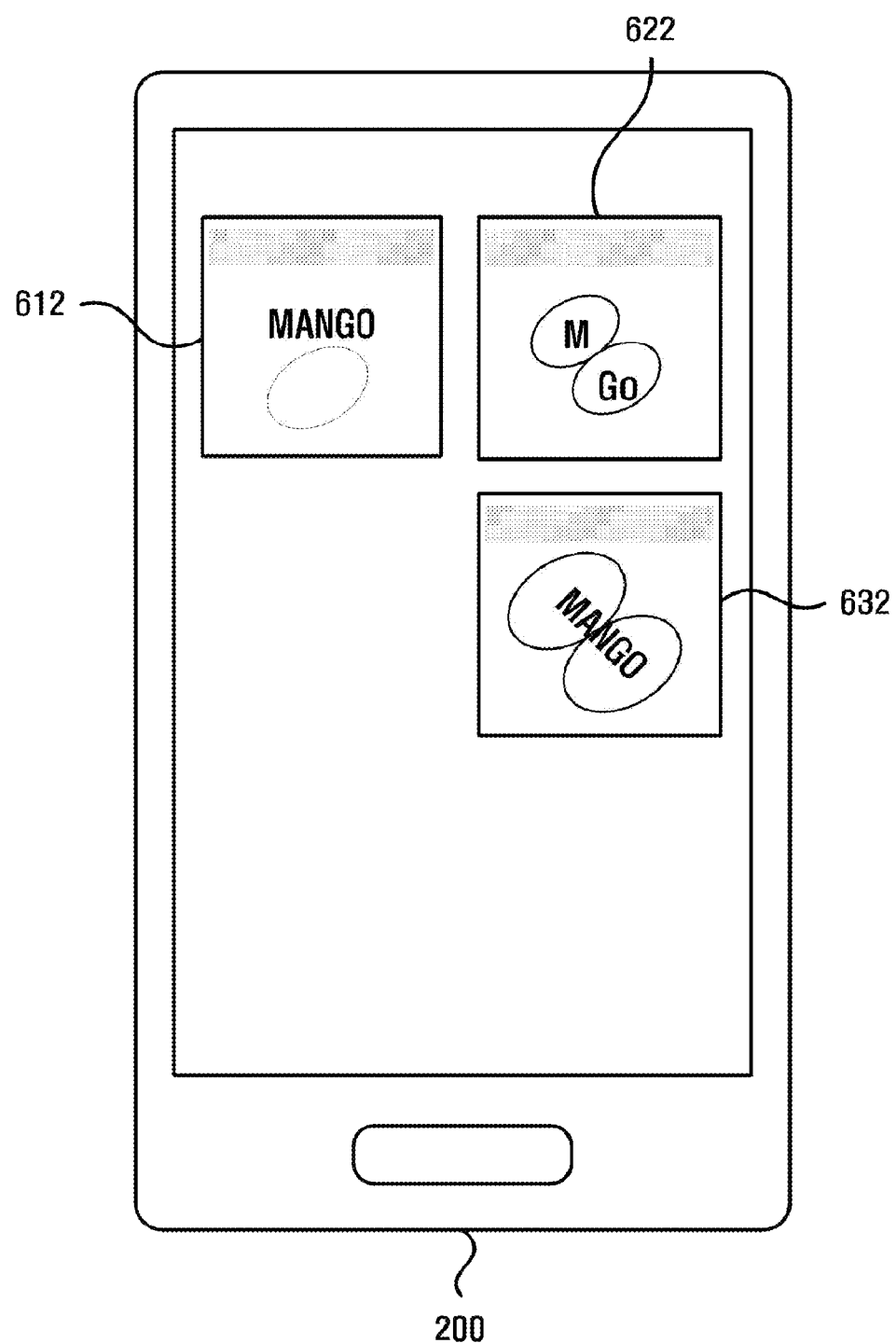
FIG. 28 is a diagram showing an example of enlarging a portion where repositionable notes are displayed in a photograph screen displayed in a screen of a user client.

FIG. 28 illustrates an example of enlarging a portion where the repositionable note 622 and 632 are displayed in the photograph screen displayed in the screen of the user client 200.

In an embodiment, the user client 200 may not automatically match an image included in a repositionable note with an image stored in the server 700.

Figure 29:
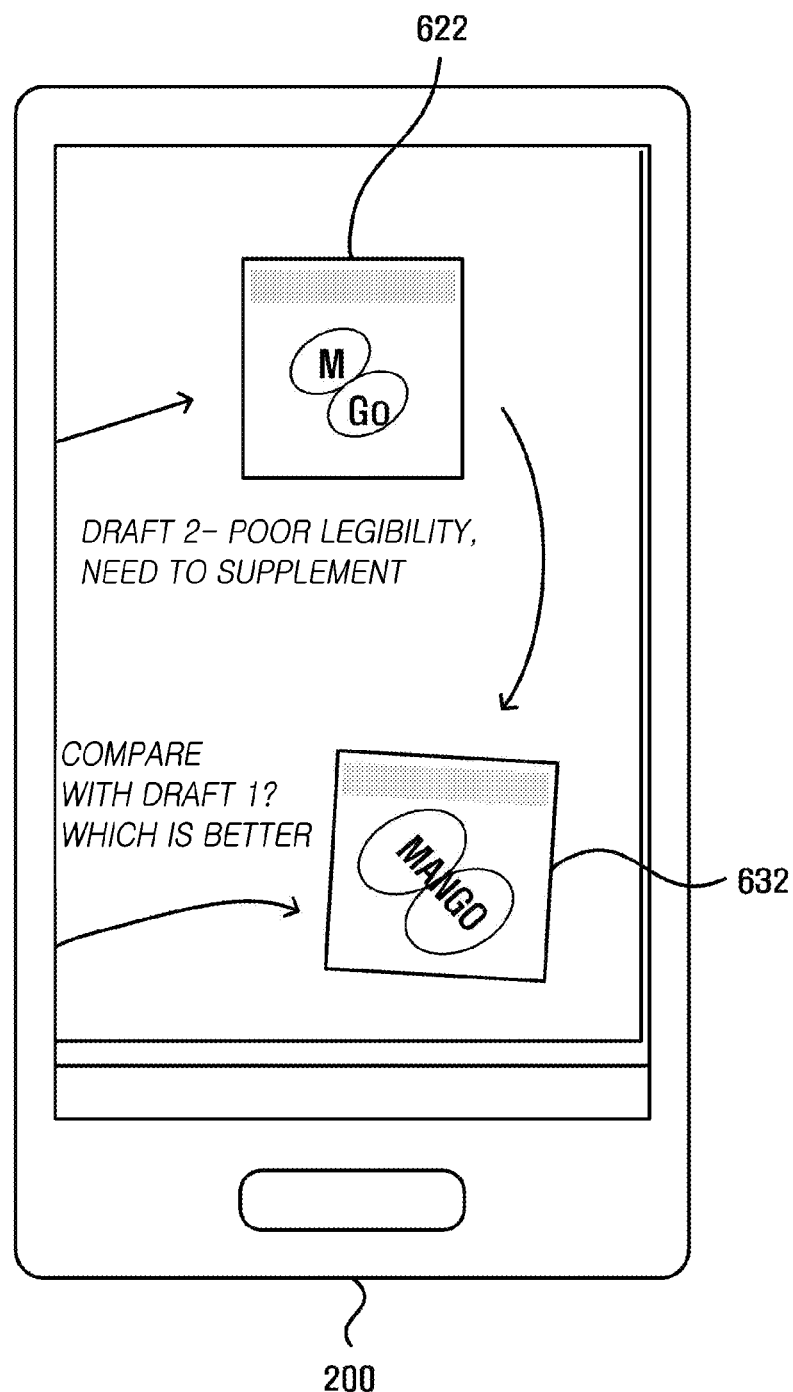
FIG. 29 is a diagram showing an example where a user client cannot automatically match an image displayed in a repositionable note with an image stored in a server.

FIG. 29 illustrates an example where the user client 200 cannot automatically match the image displayed in the repositionable note 622 with an image stored in the server 700.

In an embodiment, when the user client 200 determines the similarity between the image displayed in the repositionable note 622 and the images stored in the server 700, there may be no image with a higher similarity to the image displayed in the repositionable note 622 than a predetermined reference value. In this case, the user client 200 may fail to match the images.

In an embodiment, the user client 200 may transmit the image displayed in the repositionable note 622 to the server 700. When the server 700 determines the similarity between the image displayed in the repositionable note 622 and the images stored in the server 700, there may be no image with a higher similarity to the image displayed in the repositionable note 622 than a predetermined reference value. In this case, the server 700 may transmit a message indicating failure of matching to the user client 200.

If the images displayed in the photographed image are not substituted with the images stored in the server, when the photograph screen displayed on the user client 200 is enlarged, the enlarged photograph screen may not be displayed clearly depending on the resolution of the photograph screen.

Therefore, as shown in FIG. 29, the image included in the repositionable note 622 displayed in the enlarged photograph screen may also not be displayed clearly.

Accordingly, in this case, the user client 200 may display an interface that enables the user to directly match images in the screen.

For example, the user client 200 may display one or more images stored in the server 700 in the screen. The user client 200 may match the second image 620 selected by the user from among the one or more images 620 and 630 displayed in the screen with the image displayed in the repositionable note 622.

The user client 200 may display the second image 620 in a region where the repositionable note 622 is recognized.

In an embodiment, the user client 200 may receive the user's input to select the first image 610, the second image 620, or the third image 630 displayed in the screen of the user client 200.

If the user client 200 receives the user's input to select the first image 610, the second image 620, or the third image 630, the user client 200 may enlarge and display the selected image. For example, the user client 200 receives the user's input to select the first image 610 displayed in the screen of the user client 200, the user client 200 may enlarge the first image 610 downloaded from the server 700 and then display the enlarged first image 610 in the screen of the user client 200.

In an embodiment, if the user client 200 fails to match an image having a predetermined proportion (e.g., 50%) or more among the one or more images included in the one or more repositionable notes recognized from the photographed image with an image stored in the server 700, the user client 200 may make a request for re-photographing to the user.

Figure 30:
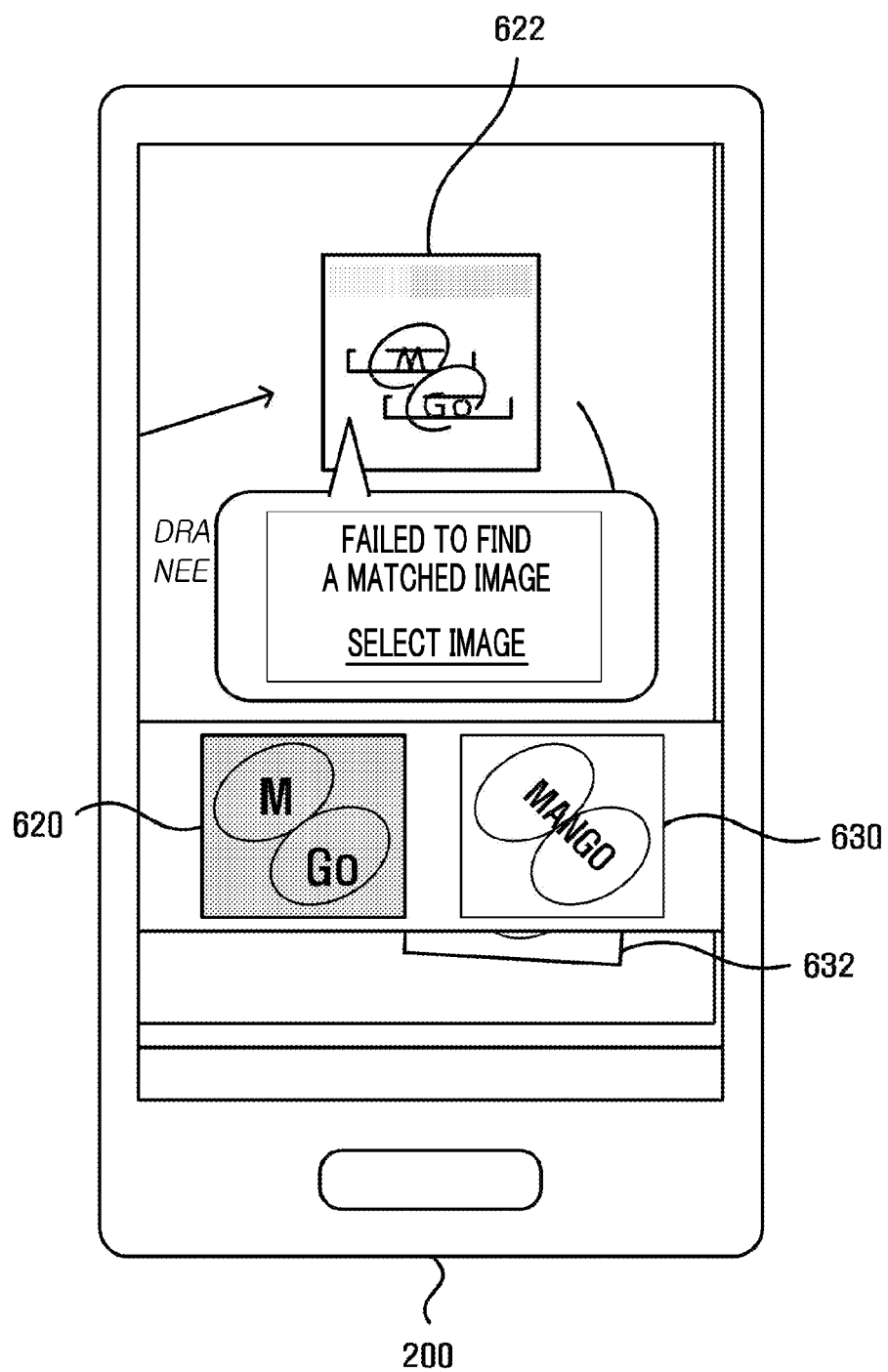
FIG. 30 is a diagram showing an example of extracting and displaying a captured repositionable note on a screen of a user client.

FIG. 30 is a diagram showing an example of extracting and displaying a captured repositionable note on a screen of a user client.

In an embodiment, the user client 200 may recognize the one or more repositionable notes 612, 622, and 632 from the screen of the user client 200 illustrated in FIG. 27, extract the recognized one or more repositionable notes 612, 622, and 632, and display the extracted one or more repositionable notes 612, 622, and 632 in the screen of the user client 200.

For example, the user client 200 may remove all the other parts except the recognized one or more repositionable notes 612, 622, and 632 from the photograph screen on the user client 200 illustrated in FIG. 27, extract only the recognized one or more repositionable notes 612, 622, and 632 and display the extracted one or more repositionable notes 612, 622, and 632 in the screen of the user client 200.

In an embodiment, the user client 200 may align and display the extracted one or more repositionable notes 612, 622, and 632 in the screen of the user client 200. A method of aligning the extracted one or more repositionable notes 612, 622, and 632 by the user client 200 may not be limited.

In an embodiment, the user client 200 may obtain the positional relationship between the one or more repositionable notes 612, 622, and 632 from the photograph screen illustrated in FIG. 27. The user client 200 may align and display the one or more repositionable notes 612, 622, and 632 based on the obtained positional relationship.

The steps of a method or algorithm described in connection with the embodiments disclosed herein may be embodied directly in hardware, in a software module executed by hardware, or in a combination of the two. The software module may reside in RAM (Random Access Memory), ROM (Read Only Memory), EPROM (Erasable Programmable ROM), EEPROM (Electrically Erasable Programmable ROM), flash memory, hard disk, a removable disk, a CD-ROM, or any other form of computer-readable storage medium known in the art.

Although the exemplary embodiments of the present disclosure have been described in detail with reference to the accompanying drawings, it would be understood by those skilled in the art that various changes and modifications may be made without changing technical conception and essential features of the present disclosure. Thus, it is clear that the above-described embodiments are illustrative in all aspects and do not limit the present disclosure.

EXPLANATION OF REFERENCE NUMERALS

100: Printer for printing a repositionable note
200: User client
210: Edit area
300: Repositionable note
310: Adhesive portion

We claim:

1. A printer system for printing a repositionable note, the printer system comprising:
a printer that has a Bluetooth search name including a color field indicating a color of the repositionable note accommodated in the printer, recognizes a color of the repositionable note accommodated in the printer and changes the color field of the Bluetooth search name according to the recognized color if the recognized color is different from a color indicated by the color field of the Bluetooth search name,
wherein colors of repositionable notes accommodated in one or more printers are displayed when the user client obtains the colors of repositionable notes by using color fields of Bluetooth search names obtained from the one or more printers, and
when an input to select one of the displayed colors is made, a Bluetooth printer with a color field of a Bluetooth search name corresponding to the selected color is paired with the user client to execute printing of the repositionable note.

2. The printer system for printing the repositionable note of claim 1, further comprising:
a cartridge that accommodates the repositionable note and is coupled to the printer,
wherein the cartridge includes an indication unit that indicates color information previously defined for the repositionable note accommodated in the cartridge.

3. The printer system for printing the repositionable note of claim 2,
wherein the printer includes a sensing unit matched with the indication unit included in the cartridge to sense color information of the repositionable note indicated by the indication unit.

4. The printer system for printing the repositionable note of claim 3,
wherein if color information of the repositionable note sensed by the sensing unit is different from the color indicated by the color field of the Bluetooth search name, the printer changes the color field of the Bluetooth search name according to the sensed color information.

5. The printer system for printing the repositionable note of claim 4,
wherein the color information of the repositionable note is expressed as a previously defined value, and
the indication unit includes one or more indicator channels for expressing the value, and
the sensing unit includes one or more sensing channels matched with the one or more indicator channels to sense values expressed by the respective one or more indicator channels, and
the printer obtains the values expressing the color information by using the one or more sensing channels and obtains color information of the repositionable note from the obtained values.

6. The printer system for printing the repositionable note of claim 5,
wherein the color information of the repositionable note is expressed as a previously defined binary number, and each of the one or more indicator channels indicates 0 or 1 representing each digit of the binary number.

7. The printer system for printing the repositionable note of claim 5,
wherein each of the one or more sensing channels is configured as a photointerrupter including a light emitting diode and a phototransistor, and the respective one or more indicator channels include means for blocking light receiving of the phototransistors according to the values indicated by the respective one or more indicator channels, and the respective one or more sensing channels sense the values indicated by the respective one or more indicator channels according to whether the phototransistors receive light or not.

8. The printer system for printing the repositionable note of claim 5,
wherein each of the one or more indicator channels includes a resistor element that has different resistances depending on the values indicated by the respective one or more indicator channels, and the respective one or more sensing channels include means for measuring resistances of the resistor elements provided in the respective indicator channels and sense the values indicated by the respective one or more indicator channels according to the values of the resistances measured from the respective indicator channels.

9. The printer system for printing the repositionable note of claim 5,
wherein each of the one or more indicator channels includes a means for allowing different currents to pass through depending on the values indicated by the respective one or more indicator channels, and the respective one or more sensing channels include means for measuring the currents of the respective indicator channels and sense the values indicated by the respective one or more indicator channels according to the values of the currents measured from the respective indicator channels.

10. The printer system for printing the repositionable note of claim 5,
wherein each of the one or more indicator channels includes a hall sensor, and the respective one or more indicator channels include magnets according to the values indicated by the respective one or more indicator channels and the respective one or more sensing channels sense the values indicated by the respective one or more indicator channels according to sensing results of the hall sensors.

11. The printer system for printing the repositionable note of claim 3,
wherein the indication unit indicates a remaining amount of the repositionable note accommodated in the cartridge, and the printer uses the sensing unit to obtain information about the remaining amount of the repositionable note indicated by the sensing unit.

12. The printer system for printing the repositionable note of claim 2,
wherein the printer includes a means for measuring a weight of the cartridge and estimates a remaining amount of the repositionable note accommodated in the cartridge by using the measured weight of the cartridge.

13. The printer system for printing the repositionable note of claim 1,
wherein the repositionable note is configured in the form of a roll including a repositionable adhesive portion, and the printer includes a cartridge that accommodates the roll-shaped repositionable note and is mounted in the printer.

14. The printer system for printing the repositionable note of claim 1,
wherein the Bluetooth search name includes a name field indicating a name of the printer and a color field indicating a color of a repositionable note accommodated in the printer.

15. The printer system for printing the repositionable note of claim 14,
wherein if the repositionable note accommodated in the printer is replaced with a repositionable note of another color, the printer recognizes the color of the replaced repositionable note and changes the color field of the Bluetooth search name according to the color of the replaced repositionable note.

16. The printer system for printing the repositionable note of claim 15,
wherein if the repositionable note accommodated in the printer is replaced with a repositionable note of another color, the printer disconnects itself from the user client, and the user client performs Bluetooth search by using the name field of the printer to connect itself again to the printer.

17. The printer system for printing the repositionable note of claim 1,
wherein if the repositionable note accommodated in the printer is replaced with a repositionable note of another color, the user client obtains a changed Bluetooth search name of the printer according to the color of the replaced repositionable note and changes the Bluetooth search name of the printer stored in the user client with the obtained Bluetooth search name.

18. The printer system for printing the repositionable note of claim 1,
wherein the printer further includes:
a display that displays the recognized color of the repositionable note on the outside of the printer; and
a lighting apparatus that displays the recognized color of the repositionable note on the inside of the printer, and
a housing of the printer is formed of a material that transmits light of the lighting apparatus, and a color of the printer is changed depending on the recognized color of the repositionable note.

* * * * *